(12) United States Patent
Takabatake et al.

(10) Patent No.: US 6,408,643 B1
(45) Date of Patent: Jun. 25, 2002

(54) ABSORPTION REFRIGERATOR

(75) Inventors: Syuzo Takabatake; Kunihiko Nakajima, both of Otsu; Kenichi Saitou, Funabashi; Hideharui Arai, Kusatsu; Masuomi Ohta, Moriyama, all of (JP)

(73) Assignee: Kawasaki Thermal Engineering Co., Ltd., Shiga (JP)

( * ) Notice: Subject to any disclaimer, the term of this patent is extended or adjusted under 35 U.S.C. 154(b) by 0 days.

(21) Appl. No.: 09/813,865

(22) Filed: Mar. 22, 2001

(30) Foreign Application Priority Data

Oct. 23, 2000 (JP) .................................... 2000-323217

(51) Int. Cl.⁷ ............................................ F25B 15/00
(52) U.S. Cl. ........................... 62/476; 62/483; 62/488; 62/101
(58) Field of Search .......................... 62/101, 141, 476, 62/481, 483, 488, 489

(56) References Cited

U.S. PATENT DOCUMENTS

| 4,722,193 A | * 2/1988 | Purvis et al. ................... 62/81 |
| 4,732,008 A | * 3/1988 | DeVault ......................... 62/79 |

\* cited by examiner

*Primary Examiner*—William Doerrler
*Assistant Examiner*—Melvin Jones
(74) *Attorney, Agent, or Firm*—Rader, Fishman & Grauer, PLLC

(57) ABSTRACT

An absorption refrigerator having three or four-stage regenerators connected in series wherein a prescribed ratio of concentrated absorption fluid is fed to the high-temperature regenerator by a part of the concentrated absorption fluid directly returned to the absorber.

39 Claims, 7 Drawing Sheets

F I G. 1
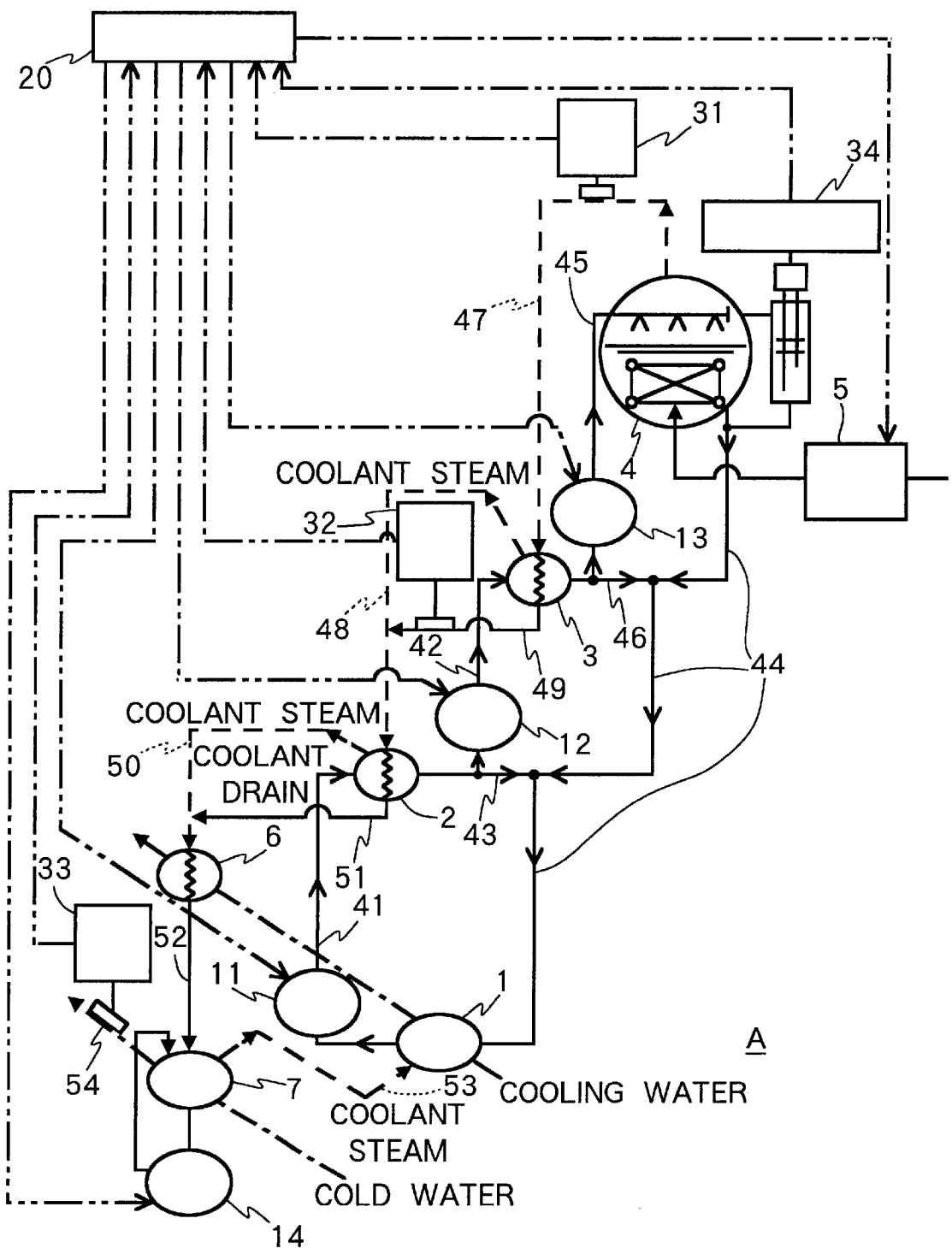

100

ABSORPTION REFRIGERATOR

TECHNICAL FIELD OF THE INVENTION

The present invention relates to an absorption refrigerator. More particularly, the invention relates to a multiple-effect absorption refrigerator in which three-stage or four-stage regenerators are connected thereto, and improves efficiency. The absorption refrigerator includes an absorption cold/hot water type.

BACKGROUND ART

Single-effect or double-effect absorption refrigerators having one or two stages of regenerators for steamizing the coolant by increasing temperature/pressure of the absorption fluid have conventionally occupied the main current in the industry.

When heating and concentrating an absorption fluid in a regenerator by a heat fed from outside, and reusing coolant steam generated therefrom as a heating source of the absorption fluid of the regenerator having a low inner pressure, in general, it is possible to accomplish heating and concentrating in a regenerator of a low inner pressure without supplying heat from outside. In the heating and concentrating method using such a pressure difference, the thermal efficiency is improved according as the number of regenerators is increased. More specifically, when each regenerator has an efficiency $\eta$ of 65% and the heat feed quantity is a, a case with a simple regenerator gives a coolant fluid of a $\times\eta$=0.65a is obtained.

With two regenerators, there is available a coolant fluid of $(a\times\eta)+(a\times\eta\times\eta)=(a\times\eta)\times(1+\eta)=1.071$. That is, the case with two regenerators gives a coolant fluid of $1.07/0.65\approx3/2$ times as large as compared with the case of a single regenerator: it suffices to use a heat feed quantity $0.65/1.07\approx2/3$ times for obtaining a coolant fluid in the same quantity.

For similar reasons, increasing the number of regenerators leads to a decreased heat feed quantity, thus permitting energy saving. Various triple-effect type absorption refrigerators having regenerators in three stages are proposed and industrialized for further improvement of cooling ability and efficiency (see Japanese Laid-Open Patent Publication No. 2000-171123 and Japanese Patent Publication No. 3040475).

FIG. 7 illustrates a triple-effect type absorption refrigerator proposed by Japanese Laid-Open Patent Publication No. 2000-171123. This absorption refrigerator 100 comprises an absorber 101, a low-temperature regenerator 102, a medium-temperature regenerator 103, a high-temperature regenerator 104, a condenser 105, an generator 106, heat exchangers 107 to 109, a fluid pump 110, and a coolant pump 111; wherein the high-temperature regenerator 104 has a pressure sensor 112, fluid level sensors 113 and 113' are provided at the exit of the high-temperature regenerator 104 so that a revolutions controller 120 sets a basic number of revolutions for the fluid pump 110 in response to output of the pressure sensor 112, and corrects the thus set revolutions on the basis of an output signal of a fluid level sensor 113.

However, in a method of setting a basic revolutions of the fluid pump 110 on the basis of only the detected value of inner pressure of the high-temperature regenerator 104 and correcting the thus set revolutions in response to an output signal of the fluid level sensor 113, as in the conventional absorption refrigerator 100, the fluid level frequently rises up or lowers down, making it impossible to achieve a stable operation. Another problem is that, because all the regenerators are fed with the absorption fluid from the fluid pump 110 alone, an optimum feed cannot be made for the individual regenerators.

And, increasing the number of regenerators may lead to a more complicated structure and a higher cost. Furthermore, even when the number of regenerators is increased, the ratio of reducing the heating quantity is decreased, so that it is necessary to select an optimum number of regenerators taking account of the balance between the cost and the efficiency.

However, the optimum number of regenerators and the ratio of circulation of the absorption fluid in a multiple-effect type absorption refrigerator are not yet known.

The present invention is developed in view of these problems in the conventional art, and has an object to provide a reverse-cycle type multiple-effect absorption refrigerator having an optimum number of regenerators with an improved efficiency, which permits stable operation with a desired cooling performance through simple means even when there is fluctuations of load.

SUMMARY OF THE INVENTION

As a result of extensive studies on the aforementioned problems, the present inventors found that the number of regenerators permitting stable operation by a simple technique was three or four, and obtained some findings about the optimum ratio of circulation of absorption fluid meeting a number of regenerators. They thus completed the present invention.

Particularly, a first aspect of the present invention relates to a triple-effect type absorption refrigerator, and a second aspect of the invention relates to a quadruple-effect type absorption refrigerator.

More specifically, a first embodiment of the first aspect of the absorption refrigerator of the invention provides an absorption refrigerator having three-stage regenerators including a low-temperature, medium-temperature and high-temperature regenerators connected in series, comprising a diluted fluid pump feeding the low-temperature regenerator with dilute fluid obtained by causing an absorption fluid to absorb a coolant by means of an absorber; an intermediate fluid pump feeding an intermediate absorption fluid obtained through heating and concentration of the diluted absorption fluid to the medium-temperature regenerator by means of the low-temperature regenerator; a concentrated fluid pump feeding a concentrated absorption fluid obtained through heating and concentration of the intermediate absorption fluid in the medium-temperature regenerator to the high-temperature regenerator; an intermediate fluid bypass piping feeding back a part of the intermediate absorption fluid directly to the absorber so as to feed only a prescribed ratio of the intermediate absorption fluid obtained in the low-temperature regenerator to the medium-temperature regenerator by means of the intermediate fluid pump; and a concentrated fluid bypass piping feeding back a part of the concentrated absorption fluid directly to the absorber so as to feed back only a prescribed ratio of the concentrated absorption fluid obtained in the medium-temperature regenerator to the high-temperature regenerator by means of the concentrated fluid pump.

A second embodiment of the first aspect of the absorption refrigerator of the invention provides an absorption refrigerator having three-stage regenerators including a low-temperature, medium-temperature and high-temperature regenerators connected in series, comprising load detecting means detecting a load; heat feeding means feeding the high-temperature regenerator with a heat quantity as a heating source; fed heat control means controlling a heat quantity fed by the heat feeding means to the high-temperature regenerator on the basis of the load detected by the load detecting means; a diluted fluid pump feeding the low-temperature regenerator with diluted fluid obtained by causing an absorption fluid to absorb a coolant by means of an absorber; an intermediate fluid pump feeding an intermediate absorption fluid obtained through heating and concentration of the diluted absorption fluid to the medium-temperature regenerator by means of the low-temperature regenerator; a concentrated-fluid pump feeding a concentrated absorption fluid obtained through heating and concentration of the intermediate absorption fluid in the medium-temperature regenerator to the high-temperature regenerator; an intermediate fluid bypass piping feeding back a part of the intermediate absorption fluid directly to the absorber so as to feed back only a prescribed ratio of the intermediate absorption fluid obtained in the low-temperature regenerator to the medium-temperature regenerator by means of the intermediate fluid pump; a concentrated fluid bypass piping feeding back a part of the concentrated absorption fluid directly to the absorber so as to feed back only a prescribed ratio of the concentrated absorption fluid obtained in the medium-temperature regenerator to the high-temperature regenerator by means of the concentrated fluid pump; and revolutions control means which controls the revolutions of the diluted fluid pump, the intermediate fluid pump and the concentrated fluid pump so as to feed only a prescribed ratio of the intermediate absorption fluid obtained in the low-temperature regenerator, to feed only a prescribed ratio of the concentrated absorption fluid obtained in the medium-temperature regenerator, and to feed a prescribed ratio of the diluted absorption fluid having absorbed the coolant in the absorber from the absorber to the low-temperature regenerator.

In the first aspect of the absorption refrigerator of the invention, it is preferable that the ratio of an initial rated circulation quantity is selected so that the prescribed ratio of the intermediate absorption fluid fed by the intermediate fluid pump to the medium-temperature regenerator is within a range of from 50 to 98% of the feed quantity of the low-temperature regenerator, that the ratio of an initial rated circulation quantity is selected so that the prescribed ratio of the concentrated absorption fluid fed by the concentrated fluid pump to the high-temperature regenerator is within a range of from 50 to 98% of the feed quantity of the medium-temperature regenerator, and that the ratio of an initial circulation quantity is selected so that the feed quantity of the concentrated fluid pump during rated operation is within a range of from 30 to 90% of the feed quantity of the diluted fluid pump.

In the second embodiment of the first aspect of the invention, it is preferable that the absorption refrigerator has steam temperature detecting means detecting the temperature of coolant steam generated in the high-temperature regenerator; the revolutions control means performs control so as to increase the revolutions of the concentrated fluid pump when the temperature of the coolant steam detected by the steam temperature detecting means is over a prescribed temperature; and the revolutions control means performs control so as to reduce the revolutions when the temperature of the coolant steam detected by the steam temperature detecting means is under a prescribed temperature.

Also, in the second embodiment of the first aspect of the absorption refrigerator of the invention, it is preferable that the absorption refrigerator has steam pressure detecting means detecting the pressure of coolant steam generated in the high-temperature regenerator; the revolutions control means performs control so as to increase the revolutions of the concentrated fluid pump when the pressure of the coolant steam detected by the steam pressure detecting means is over a prescribed pressure; and the revolutions control means performs control so as to decrease the revolutions of the concentrated fluid pump when the pressure of the coolant steam detected by the steam pressure detecting means is under the prescribed pressure.

Furthermore, in the second embodiment of the first aspect of the invention, it is preferable that the absorption refrigerator has drain temperature detecting means detecting the temperature of coolant drain after heating the medium-temperature generator of the coolant steam, fed as a heating source for heating and concentrating the intermediate absorption fluid from the high-temperature regenerator to the medium-temperature regenerator; and the revolutions control means performs control so as to increase the revolutions of the concentrated fluid pump when the temperature of the coolant drain detected by the drain temperature detecting means is over a prescribed temperature. In this case, it is more preferable that, when the temperature of the coolant drain detected by the drain temperature detecting means is under the prescribed temperature, the revolutions control means performs control so as to reduce the revolutions of the concentrated fluid pump.

Also, in the second embodiment of the first aspect of the absorption refrigerator of the invention, it is preferable that the absorption refrigerator has a fluid level detecting means detecting the level of the absorption fluid in the high-temperature regenerator; the revolutions control means performs control so as to reduce the number of revolutions of the concentrated fluid pump when the level of the absorption fluid in the high-temperature regenerator detected by the fluid level detecting means is over an upper limit level, and increases the number of revolutions of the concentrated fluid pump when level of the absorption fluid in the high-temperature regenerator detected by the fluid level detecting means is under a low limit level. In this case it is more preferable that the absorption refrigerator further comprises an alarm and emergency stop means which, when the level of the absorption fluid in the high-temperature regenerator detected by the fluid level detecting means is under an emergency set value set for safety, gives an alarm, and stop feeding of heat by the heat feeding means. It is also preferable that, when the revolutions control means adjusts the number of revolutions of the concentrated fluid pump in response to the result of detection by the fluid level detecting means, the number of revolutions of the concentrated fluid pump is changed stepwise within a predetermined range of revolutions; that, when the revolutions control means adjusts the number of revolutions of the concentrated fluid pump in response to the result of detection by the fluid level detecting means, the number of revolutions of the concentrated fluid pump is changed continuously; or that, when the revolutions control means adjusts the number of revolutions of the concentrated fluid pump in response to the result of detection by at least one of the steam temperature detecting means, the steam pressure detecting means, the drain temperature detecting means and the fluid level detecting means, control is performed so as to simultaneously adjust also the number of revolutions of at least any one of the diluted fluid pump and the intermediate fluid pump. In this case, the revolutions control means may previously set combinations of a number of revolutions of the concentrated fluid pump, the simultaneously controlled diluted fluid pump and/or the intermediate fluid pump, and a combination may be appropriately selected from these combinations.

A second aspect of the absorption refrigerator of the invention provides an absorption refrigerator having four-stage regenerators including a low-temperature, a medium-temperature, a second medium-temperature and a high-temperature regenerators connected in series, comprising load detecting means detecting the load; heat feeding means feeding a heat quantity as a heating means to the high-temperature regenerator; fed heat control means controlling a heat quantity fed by the heat feeding means to the high-temperature regenerator on the basis of the load detected by the load detecting means; a diluted fluid pump feeding a diluted absorption fluid obtained through absorption of a coolant by an absorption fluid by means of an absorber to the low-temperature regenerator; an intermediate fluid pump feeding an intermediate absorption fluid obtained by heating and concentrating the diluted absorption fluid in the low-temperature regenerator to the medium-temperature regenerator; a second intermediate fluid pump feeding the second intermediate absorption fluid obtained by heating and concentration the intermediate absorption fluid in the medium-temperature regenerator to the second medium-temperature regenerator; a concentrated fluid pump feeding the concentrated absorption fluid obtained through heating and concentration of the second intermediate absorption fluid in the second medium-temperature regenerator to the high-temperature regenerator; an intermediate fluid bypass piping feeding back a part of the intermediate absorption fluid directly to the absorber so as to feed a prescribed ratio of the intermediate absorption fluid obtained in the low-temperature regenerator to the medium-temperature regenerator by means of the intermediate fluid pump; a second intermediate fluid bypass piping feeding back a part of the second intermediate absorption fluid directly to the absorber so as to feed a prescribed ratio of the second intermediate absorption fluid obtained in the medium-temperature regenerator to the second medium-temperature regenerator by means of the second intermediate fluid pump; a concentrated fluid bypass piping feeding back a part of the concentrated absorption fluid directly to the absorber so as to feed a prescribed ratio of the concentrated absorption fluid obtained in the second medium-temperature generator to the high-temperature regenerator by means of the concentrated fluid pump; and revolutions control means controlling the number of revolutions of the diluted fluid pump, the intermediate fluid pump, the second intermediate fluid pump and the concentrated fluid pump so as to feed a prescribed ratio of the intermediate absorption fluid obtained in the low-temperature regenerator to the medium-temperature regenerator, feed a prescribed ratio of the second intermediate absorption fluid obtained in the medium-temperature regenerator to the second medium-temperature regenerator, feed only a prescribed ratio of the concentrated absorption fluid obtained in the second medium-temperature regenerator, and feed a prescribed ratio of the diluted absorption fluid having absorbed the coolant by means of the absorber from the absorber to the low-temperature regenerator.

In the second aspect of the absorption refrigerator of the invention, it is preferable that the ratio of an initial rated circulation quantity is selected so that the prescribed ratio of the intermediate absorption fluid fed by the intermediate fluid pump to the medium-temperature regenerator is within a range of from 50 to 98% of the feed quantity of the low-temperature regenerator; that the ratio of an initial rated circulation quantity is selected so that the prescribed ratio of the second intermediate absorption fluid fed by the intermediate fluid pump to the second medium-temperature regenerator is within a range of from 50 to 98% of the feed quantity of the medium-temperature regenerator; that the ratio of an initial rated circulation quantity is selected so that the prescribed ratio of the concentrated absorption fluid fed by the concentrated fluid pump to the high-temperature regenerator is within a range of from 50 to 98% of the feed quantity of the second medium-temperature regenerator; or that the ratio of an initial circulation quantity is selected so that the feed quantity of the concentrated fluid pump during rated operation is within a range of from 30 to 90% of the feed quantity of the diluted fluid pump.

Also, in the second aspect of the absorption refrigerator of the invention, it is preferable that the absorption refrigerator has steam temperature detecting means detecting the temperature of coolant steam generated in the high-temperature regenerator; the revolutions control means performs control so as to increase the revolutions of the concentrated fluid pump when the temperature of the coolant steam detected by the steam temperature detecting means is over a prescribed temperature; and the revolutions control means performs control so as to reduce the revolutions when the temperature of the coolant steam detected by the steam temperature detecting means is under a prescribed temperature.

Furthermore, in the second aspect of the absorption refrigerator of the invention, it is preferable that the absorption refrigerator has steam pressure detecting means detecting the pressure of coolant steam generated in the high-temperature regenerator; the revolutions control means performs control so as to increase the revolutions of the concentrated fluid pump when the pressure of the coolant steam detected by the steam pressure detecting means is over a prescribed pressure; and the revolutions control means performs control so as to decrease the revolutions of the concentrated fluid pump when the pressure of the coolant steam detected by the steam pressure detecting means is under the prescribed pressure.

Moreover, in the second aspect of the absorption refrigerator of the invention, it is preferable that the absorption refrigerator has drain temperature detecting means detecting the temperature of coolant drain after heating the second medium-temperature regenerator of the coolant steam, fed as a heating source for heating and concentrating the second intermediate absorption fluid from the high-temperature regenerator to the second medium-temperature regenerator; and a second temperature detecting means detecting the coolant drain temperature after heating the medium-temperature regenerator of coolant steam fed as a heating source for heating and concentrating the intermediate absorption fluid from the second medium-temperature regenerator to the medium-temperature regenerator; and, when at least one of the coolant drain temperatures detected by the drain temperature detecting means and the second drain temperature detecting means becomes over the prescribed temperature thereof, the revolutions control means performs control so as to increase the number of revolutions of the concentrated fluid pump.

In this case, it is preferable that, when at least one of the coolant drain temperatures detected by the drain temperature detecting means and the second drain temperature detecting means becomes under the prescribed temperature thereof, the revolutions control means performs control so as to reduce the number of revolutions of the concentrated fluid pump; or that the absorption refrigerator has a fluid level detecting means detecting the level of the absorption fluid in the high-temperature regenerator; the revolutions control means performs control so as to reduce the number of revolutions of the concentrated fluid pump when the level of the absorption fluid in the high-temperature regenerator detected by the fluid level detecting means is over an upper limit level, and increases the number of revolutions of the concentrated fluid pump when the level of the absorption fluid in the high-temperature regenerator detected by the fluid level detecting means is under a low limit level. In addition, it is also preferable that the absorption refrigerator comprises an alarm and emergency stop means which, when the level of the absorption fluid in the high-temperature generator detected by the fluid level detecting means is under emergency set value for safety, gives an alarm, and stop feeding of heat by the heat feeding means; that, when the revolutions control means adjusts the number of revolutions of the concentrated fluid pump in response to the result of detection by the fluid level detecting means, the number of revolutions of the concentrated fluid pump is changed stepwise within a predetermined range of revolutions; that, when the revolutions control means adjusts the number of revolutions of the concentrated fluid pump in response to the result of detection by the fluid level detecting means, the number of revolutions of the concentrated fluid pump is changed continuously; or that, when the revolutions control means adjusts the number of revolutions of the concentrated fluid pump in response to the result of detection by at least one of the steam temperature detecting means, the steam pressure detecting means, the drain temperature detecting means, the second drain temperature detecting means and the fluid level detecting means, control is performed so as to simultaneously adjust also the number of revolutions of at least any one of the diluted fluid pump, the intermediate fluid pump and the second intermediate fluid pump. It is also preferable that the revolutions control means previously sets combinations of a number of revolutions of the concentrated fluid pump, the simultaneously controlled diluted fluid pump, the intermediate fluid pump, and/or the second intermediate fluid pump, and a combination can be appropriately selected from these combinations.

Also, in the second aspect of the absorption refrigerator of the invention, the absorption refrigerator may have at least one of a low-temperature heat exchanger which heats the diluted absorption fluid fed from the diluted fluid pump and feeds the same to the low-temperature regenerator, a medium-temperature heat exchanger which heats the intermediate absorption fluid fed from the intermediate fluid pump and feeds the same to the medium-temperature regenerator, a second medium-temperature heat exchanger which heats the second intermediate absorption fluid fed from the second intermediate fluid pump and feeds the same to the second medium-temperature regenerator, and a high-temperature heat exchanger which heats the concentrated absorption fluid fed from the concentrated fluid pump and feeds the same to the high-temperature regenerator.

Furthermore, in the second aspect of the absorption refrigerator of the invention, the absorption refrigerator may comprise a second high-temperature steam return piping feeding the coolant steam from the high-temperature regenerator as a heating source to the medium-temperature regenerator; and a steam piping change-over valve provided in the second high-temperature steam return piping; wherein the coolant steam from the high-temperature regenerator is fed as a heating source to the second temperature regenerator and the medium-temperature regenerator. In this case, the absorption refrigerator may comprise a branched coolant drain piping causing the second medium-temperature regenerator and the medium-temperature regenerator to communicate with each other; and a drain piping change-over valve provided in the branched drain piping; or the steam piping change-over valve may be a safety valve which opens when a pressure of over a value set for safety is applied.

Also, in the second aspect of the absorption refrigerator of the invention, the drain piping change-over valve may be controlled so as to open when the temperature in the high-temperature regenerator becomes over a value set for safety.

Further, in the second aspect of the absorption refrigerator of the invention, it is preferable that only the second medium-temperature regenerator, or both the second medium-temperature regenerator and the medium-temperature regenerator comprise pressure vessels.

Still, in the absorption refrigerator of the invention, the high-temperature regenerator may have a steam-fluid separator that separates generated coolant steam and the absorption fluid; or, the high-temperature regenerator may be a once-through boiler.

In the absorption refrigerator of the invention, for example, the coolant is water, and the absorption fluid mainly comprises lithium bromide.

In the absorption refrigerator of the present invention, having the configuration as described above, it is possible to optimize the circulation quantity of the absorption fluid to the individual regenerators by adjusting the number of revolutions of each pump, thus to improve the efficiency, and ensure stable operation with a desired cooling ability even when there is fluctuation of load.

BRIEF DESCRIPTION OF THE DRAWINGS

FIG. 1 is a schematic view of the absorption refrigerator of embodiment 1 of the present invention.

DETAILED DESCRIPTION

Figure 2:
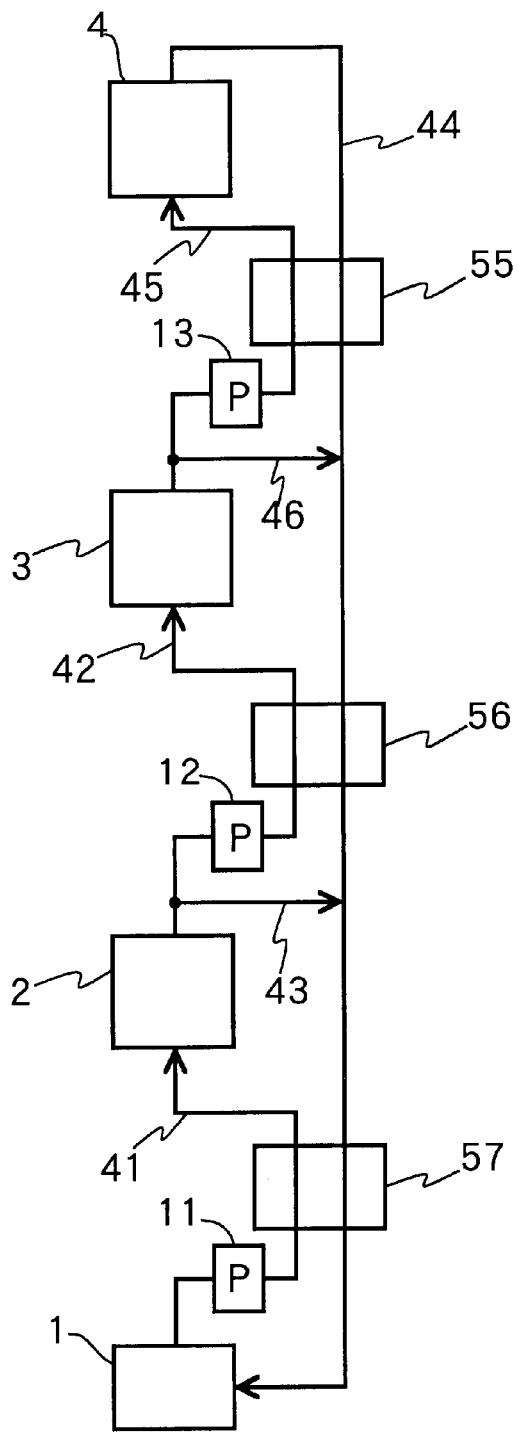
FIG. 2 is a schematic view of the essential part of the absorption refrigerator of Embodiment 2 of the invention.

The present invention is described according to embodiments with reference to the attached drawings.

EMBODIMENT 1

FIG. 1 illustrates a schematic configuration of the absorption refrigerator of Embodiment 1. This absorption refrigerator A is a reverse-cycle type triple-effect absorption refrigerator which comprises an absorber 1 which causes an absorption fluid comprising mainly LiBr (lithium bromide) to absorb a coolant such as water, a low-temperature regenerator 2 which heats the diluted absorption fluid having a concentration decreased by absorption of the coolant in the absorber 1 to generate a part of the coolant from the diluted absorption fluid, thereby obtaining an intermediate absorption fluid resulting from concentration of the diluted absorption fluid, a medium-temperature regenerator 3 which gives a concentrated absorption fluid resulting from further concentration of the intermediate absorption fluid achieved by generating a part of the coolant further from the intermediate absorption fluid by heating the intermediate absorption fluid obtained in the low-temperature regenerator 2, and a high-temperature regenerator 4 which gives an extra-concentrated absorption fluid resulting from further concentration of the concentrated absorption fluid achieved by generating a part of the coolant further from the concentrated absorption fluid by heating the concentrated absorption fluid obtained in the medium-temperature regenerator 3.

The high-temperature regenerator 4 has a steam-fluid separator (not shown in the figure) which separates the regenerated coolant steam from the extra-concentrated absorption fluid. A steam-fluid separator conventionally used for separating a steam from water in a heat exchanger is suitably used as this steam-fluid separator. The absorption fluid contains an alcohol such as 2-ethylhexanol in a slight amount as a heat transfer accelerator.

The absorption refrigerator A of this embodiment has a heat feeding unit 5 which feeds heat from outside the refrigerator A as a heating source for heating the concentrated absorption fluid in the high-temperature regenerator 4. Coolant steam generated in the high-temperature regenerator 4 with heat fed from the heat feeding unit 5 as a heating source is used as a heating source for heating and concentrating the intermediate absorption fluid in the medium-temperature regenerator 3. The coolant steam after heating in the medium-temperature regenerator 3 (hereinafter referred to as the "coolant drain") and the coolant steam generated in the medium-temperature regenerator 3 are used as a heating source for heating the diluted absorption fluid in the low-temperature regenerator 2.

Coolant drain after heating in the low-temperature regenerator 2 and coolant steam generated in the low-temperature regenerator 2 are fed to a condenser 6, cooled by cooling water in the condenser 6, and fed to an generator 7 in a fluid form, i.e., as a coolant. The coolant fed to the generator 7 is sprayed therein, and generated by taking the heat of generation from the object of cooling such as water, and on the other hand, this cools the cold water as an object of cooling. Alcohol added as a heat transfer accelerator to the absorption fluid condensed, together with the coolant, in the condenser 6, fed to a coolant sink (not shown in the figure) of the generator 7, separated from the coolant by an overflow weir provided in the coolant sink, and fed back to the absorber 1.

This absorption refrigerator A comprises a diluted fluid pump 11 which feeds the diluted absorption fluid from the absorber 1 to the low-temperature regenerator 2, an intermediate fluid pump 12 which feed the medium absorption fluid from the low-temperature regenerator 2 to the medium-temperature regenerator 3, a concentrated fluid pump 13 which feeds the concentrated absorption fluid from the medium-temperature regenerator 3 to the high-temperature regenerator 4, a coolant pump 14 which circulates the coolant not generated in the generator 7, and a controller 20 which controls the feed quantity of the absorption fluid by these pumps 11, 12 and 13, and controls the heat quantity fed by the heat feeding unit 5 in response to changes in the operating conditions (set temperature of cold water) and load (change in temperature of cold water) of the absorption refrigerator A.

Also, the heat feeding unit 5 feeds waste heat generated in external facilities such as a gas turbine and a gas engine or combustion heat generated in a boiler to the high-temperature regenerator 4 in accordance with control by the controller 20.

Further, the high-temperature regenerator 4 and the heat feeding unit 5 may be a once-through boiler integrally comprising them.

Furthermore, the absorption refrigerator A comprises a steam temperature sensor 31 which detects temperature of coolant steam regenerated in the high-temperature regenerator 4, a drain temperature sensor 32 which detects temperature of coolant drain after heating in the medium-temperature regenerator 3, a cold water temperature sensor (load detecting means) 33 which detects temperature of an object of cooling such as cold water cooled in the generator 7, and a fluid level sensor (fluid level detecting means) 34 which detects the fluid level of the absorption fluid in the high-temperature regenerator, and detection signals from these sensors 31, 32, 33 and 34 are entered into the controller 20. A steam pressure sensor may be provided in place of the steam temperature sensor 31.

The circulation cycle of the absorption fluid in the absorption refrigerator A is described as follows.

The absorption fluid absorbs coolant steam in the absorber 1 to become a diluted fluid of a prescribed concentration (for example, 54 to 56 wt %), which is fed by a diluted fluid pump 11 to the low-temperature regenerator 2 via a diluted fluid feed piping 41. The diluted absorption fluid fed to the low-temperature regenerator 2 is heated and concentrated in the low-temperature regenerator 2 to become an intermediate absorption fluid of a prescribed concentration (for example, 55 to 57 wt %). A prescribed percentage of this intermediate absorption fluid (for example, 50 to 98%) is fed by an intermediate fluid pump 12 to the medium-temperature regenerator 3 via an intermediate fluid feeding piping 42. The rest is fed to a return piping 44 which brings the absorption fluid back to the absorber 1 via an intermediate fluid bypass piping 43 branching between the intermediate fluid pump 12 and the low-temperature regenerator 2.

The intermediate absorption fluid fed to the medium-temperature regenerator 3 is heated and concentrated in the medium-temperature regenerator 3 to become a concentrated absorption fluid of a prescribed concentration (for example, 57 to 59 wt %). A prescribed percentage (for example, 50 to 98%) of this concentrated absorption fluid is fed to the high-temperature regulator 4 by a concentrated fluid pump 13 via a concentrated fluid feed piping 45. The rest is fed to the return piping 44 which sends the absorption fluid back to the absorber 1, via a concentrated fluid bypass piping 46 formed by branching a concentrated fluid feed piping 45 between the concentrated fluid pump 13 and the medium-temperature regenerator 3.

The concentrated absorption fluid fed to the high-temperature regenerator 4 is heated and concentrated in the high-temperature regenerator 4 to become an extra-concentrated absorption fluid of a prescribed concentration (for example, 60 to 62 wt %). The extra-concentrated absorption fluid is fed to the absorber 1 via the return piping 44. The concentration of the extra-concentrated fluid brought back to the absorber 1 via the return piping 44 decreases to a prescribed level (for example, 59 to 61 wt %) under the effect of the confluence of the concentrated absorption fluid from the medium-temperature regenerator 3 in the downstream via a bypass piping 46. In further downstream, confluence of the intermediate absorption fluid from the low-temperature regenerator 2 via the intermediate fluid bypass piping 43 reduces the concentration to a prescribed level (for example, 58.5 to 60.5 wt %), and then, the fluid is fed to the absorber 1.

The circulation cycle of the coolant is described as follows.

The coolant steam generated from the concentrated absorption fluid in the high-temperature regenerator 4 is fed as a heating source to the medium-temperature regenerator 3 via a high-temperature steam return piping 47. The coolant steam generated from the intermediate absorption fluid in the medium-temperature regenerator 3 is fed as a heating source to the low-temperature regenerator 2 via a medium-temperature steam return pipings 48. The coolant drain after heating in the medium-temperature regenerator 3 joins the medium-temperature steam return piping 48 via a first coolant drain piping 49.

Coolant steam generated from the diluted absorption fluid in the low-temperature regenerator 2 is fed to the condenser 6 via a low-temperature steam return piping 50. The coolant drain after heating in the low-temperature regenerator 2 joins the low-temperature steam return piping 50 via a second coolant drain piping 51.

The coolant steam fed to the condenser 6 is cooled by cooling water into fluid, i.e., into a coolant, and fed to the generator 7 via a piping 52. The coolant fed to the generator 7 is generated in the generator 7, fed back to the absorber 1 via a steam piping 53, and absorbed into the absorption fluid.

The steam temperature sensor 31 is provided near the exit of the high-temperature regenerator 4 in the high-temperature steam return piping 47; the drain temperature sensor 32 is provided near the exit of the medium-temperature regenerator 3 in the first coolant drain piping 49; and the cold water temperature sensor 33 is provided near the exit of the generator 7 in the cold water piping 54 feeding cold water through the generator 7.

The control performed by the controller 20 is described as follows.

In Embodiment 1, the feed quantity of the absorption fluid is controlled by adjusting the number of revolutions for the diluted fluid pump 11, the intermediate fluid pump 12 and the concentrated fluid pump 13. More specifically, the flow rate of the diluted absorption fluid fed by the diluted fluid pump 11 from the absorber 1 to the low-temperature regenerator 2, the flow rate of the intermediate absorption fluid fed by the intermediate fluid pump 12 from the low-temperature regenerator 2 to the medium-temperature regenerator 3, and the flow rate of the concentrated absorption fluid fed by the concentrated fluid pump 13 from the medium-temperature regenerator 3 to the high-temperature regenerator 4 are controlled. Although not shown, revolutions control means is provided on the controller 20 to control the number of revolutions of the individual pumps 11, 12 and 13.

More particularly, in the absorption refrigerator A, adjustment is made so that the flow rate of the absorption fluid flowing through the feed pipings 41, 42 and 45 becomes a prescribed flow rate in the rated operation by providing orifices (not shown in the figure) of an appropriate diameter at exits of the pumps 11, 12 and 13. When it is necessary to readjust the circulation quantity of the absorption fluid under a changing load, the flow rate of the absorption fluid is adjusted by changing the number of revolutions of the individual pumps 11, 12 and 13. The reason is as follows: even when trying to control the flow rate of the absorption fluid by providing control valves in the individual pipings 41, 42 and 45 with a uniform number of revolutions for all the pumps 11, 12 and 13, it is impossible to control the flow rate accurately because of the high feed pressure of the pumps 11, 12 and 13 since the absorption fluid is to be fed to the regenerators 2, 3 and 4 in a three-stage configuration.

In the absorption refrigerator A, in other words, having a configuration in which three-stage regenerators 2, 3 and 4 including low-temperature, medium-temperature and high-temperature ones connected in series, it results in a large pressure difference between the absorber 1 and the high-pressure regenerator 4, leading to a very high head for the individual pumps 11, 12 and 13. As a result, control with a control valve as in the conventional single-effect refrigerator or double-effect refrigerator does no permit an appropriate flow rate control. In this embodiment, therefore, an appropriate flow rate control is made achievable by adjusting the number of revolutions of the individual pumps 11, 12 and 13.

When the load is stable, the heat quantity fed by the heat feeding unit 5 is also constant, causing no problem. When the load changes, however, the heat quantity fed by the heat feeding unit 5 is also adjusted accordingly. This results in a large change in temperature and pressure in the high-temperature regenerator 4, causing imbalance of absorption fluid flow rate or a change in the absorption fluid level in the high-temperature regenerator 4, thus making it difficult to continue stable operations. In this case also, control with a control valve as in the conventional single-effect refrigerator or double-effect refrigerator does not permit appropriate control of the flow rate, and it becomes important to accomplish flow rate control by adjusting the number of revolutions of the pumps 11, 12 and 13.

Control of the number of revolutions of the pumps 11, 12 and 13 carried out by the controller 20 is described in detail as follows.

When there is a change in load, i.e., in the cold water temperature detected by the cold water temperature sensor 33, the controller 20 adjusts the heat quantity fed by the heat feeding unit 5 so as to offset this change in load through fed heat quantity control means (not shown in the figure). In other words, the fed heat quantity is increased when the load increases, and the fed heat quantity is decreased when the load is reduced.

When then the heat quantity fed by the heat feeding unit 5 is thus adjusted, pressure and temperature in the high-temperature regenerator 4 change accordingly, leading to changes in pressure and temperature of the coolant steam generated in the high-temperature regenerator 4. This change in the coolant steam temperature is detected by the steam temperature sensor 31 and the drain temperature sensor 32, and the results are entered into the controller 20. The controller 20 controls the number of revolutions of the concentrated fluid pump 13 as follows, in response to a change in the coolant steam temperature.

For example, when the load increases, leading to an increase in the heat quantity fed by the heat feeding unit 5, pressure and temperature in the high-temperature regenerator 4 and pressure and temperature of the coolant steam generated in the high-temperature regenerator 4. In such a case, the controller 20 performs control so as to increase the number of revolutions of the concentrated fluid pump 13, thereby increasing the absorption fluid flow rate to reduce the inner pressure of the high-temperature regenerator 4.

When the heat quantity fed by the heat feeding unit 5 is decreased by a decrease in load, on the contrary, pressure and temperature in the high-temperature regenerator and pressure and temperature of the coolant steam generated in the high-temperature regenerator 4 decrease. In this case, the controller 20 performs control so as to decrease the number of revolutions of the concentrated absorption fluid pump 13 and reduce the absorption fluid flow rate to increase the inner pressure of the high-temperature regenerator 4. As a result, it is made possible to continue stable operation within a temperature range and a pressure range suitable for continuous operation of the refrigerator A.

The controller 20 adjusts the number of revolutions of the concentrated fluid pump 13 in response to a detection signal of the fluid level detecting sensor 34 to control the absorption fluid level in the high-temperature regenerator 4 within a prescribed range. When the fluid level detecting sensor 34 detects a prescribed high fluid level (upper limit level), the controller 20 performs control so as to bring down the fluid level by reducing the absorption fluid flow rate through a decrease in the number of revolutions of the concentrated fluid pump 13, and on the other hand, when the fluid level detecting sensor 34 detects a prescribed low fluid level(low limit level), the controller 20 performs control so as to raise the fluid level by increasing the absorption fluid flow rate through an increase in the number of revolutions of the concentrated fluid pump 13.

When the absorption fluid level of the high-temperature regenerator 4 becomes lower than a prescribed emergency set value set by taking account of safe operation of the refrigerator A, the controller 20 performs control so as to issue an alarm by means of alarm means (not shown in the figure), and to stop the feeding of heat by the heat feeding unit 5.

When adjusting the number of revolutions of the concentrated fluid pump 13 in response to the result of detection of the fluid level detecting sensor 34, the controller 20 may perform control so as to switch over the number of revolutions of the concentrated fluid pump 13 within a range of numbers of revolutions previously set stepwise in response to the operating conditions and the heat quantity fed by the heat feeding unit 5. For example, the control frequency of the pump may be switched over to 60 Hz, 57 Hz, 48 Hz, and 45 Hz, thereby carrying out stepwise control by increasing or decreasing the number of revolutions of the concentrated fluid pump 13, or the number of revolutions may be continuously changed in response to the load and the heat quantity fed by the heat feeding unit 5.

When controlling the number of revolutions of the concentrated fluid pump 13 in response to the result of detection of the steam temperature sensor 31, the drain temperature sensor 32 and the fluid level detecting sensor 34, it is possible to execute control of the other pumps 11 and 12 by selecting an appropriate combination from the combinations shown in the following Table 1.

TABLE 1

|  | Diluted Fluid Pump | Intermidiate Fluid Pump | Concentrated Fluid Pump |
| --- | --- | --- | --- |
| Combination 1 | Revolution control | Revolution control | Revolution control |
| Combination 2 | Revolution control | Constant | Revolution control |
| Combination 3 | Constant | Constant | Revolution control |

In this case, control is carried out so as to adjust the feed quantity of the absorption fluid by the pumps 11, 12 and 13 to increase the operating efficiency of the refrigerator A, and to ensure a number of revolutions of the pumps 11, 12 and 13 not causing shortage of fed quantity of the absorption fluid or shortage of head.

According to the absorption refrigerator A of this embodiment 1, in which the controller 20 appropriately adjusts the heat quantity fed by the heat feeding unit 5 when there is a change in load, and the number of revolutions of the diluted fluid pump 11, the intermediate fluid pump 12 and the concentrated fluid pump 13 is controlled so as to inhibit a change in the amount of the absorption fluid in the regenerators caused by a change in the fed heat quantity, it is possible, in a so-called triple-effect type absorption refrigerator, to stably and continuously supply cold water at a desired temperature even when there is a large fluctuation of load.

By providing a fluid level sensor 34 in the high-temperature regenerator 4, it is monitored whether or not the amount of absorption fluid in the regenerators is always within a prescribed range, and when the prescribed range is exceeded, the number of revolutions of the concentrated fluid pump 13 is adjusted so that the amount of absorption fluid in the regenerator 4 is within a prescribed range. This makes it possible to temporarily change the ratio of the absorption fluid flow rate fed from the medium-temperature regenerator 3 to the high-temperature regenerator 4 to the amount of absorption fluid fed to the return piping 44 via the concentrated fluid bypass piping 46, from that for the rated operation. More specifically, it is possible to adjust the heating quantity in the high-temperature regenerator 4 in response to a change in load, and at the same time, to stably carry out cold water temperature control, in a triple-effect type absorption refrigerator, by detecting the coolant steam temperature and the fluid level in the high-temperature regenerator 4 and by controlling the number of revolutions of the concentrated fluid pump 13 so as to inhibit a change in the fluid level caused by such an adjustment of the heating quantity.

When the feed quantity of the absorption fluid decreases as a result of a failure of the concentrated fluid pump 13 or the like, and the amount of the absorption fluid in the high-temperature regenerator 4 as detected by the fluid level detecting sensor 34 decreases to under a prescribed emergency set value, an alarm is issued by the alarm means and heating is discontinued to stop operation of the absorption refrigerator A for safety. This permits prevention of occurrence of circumstances causing a trouble in the continuous operation such as overheating or a resulting damage to the high-temperature regenerator 4.

In place of this safety stop control applied on the basis of the result of detection by the fluid level detecting sensor 34, an absorption fluid temperature sensor, for the prevention of an empty state, for detecting overheating caused by a decrease in the absorption fluid may be provided in the high-temperature regenerator 4, and similar safety stop control may be executed in accordance with the result of detection thereof.

The absorption fluid is fed sequentially from the absorber 1, through the low-temperature regenerator 2, the medium-temperature regenerator 3 to the high-temperature regenerator 4, in a reverse cycle.

Figure 7:
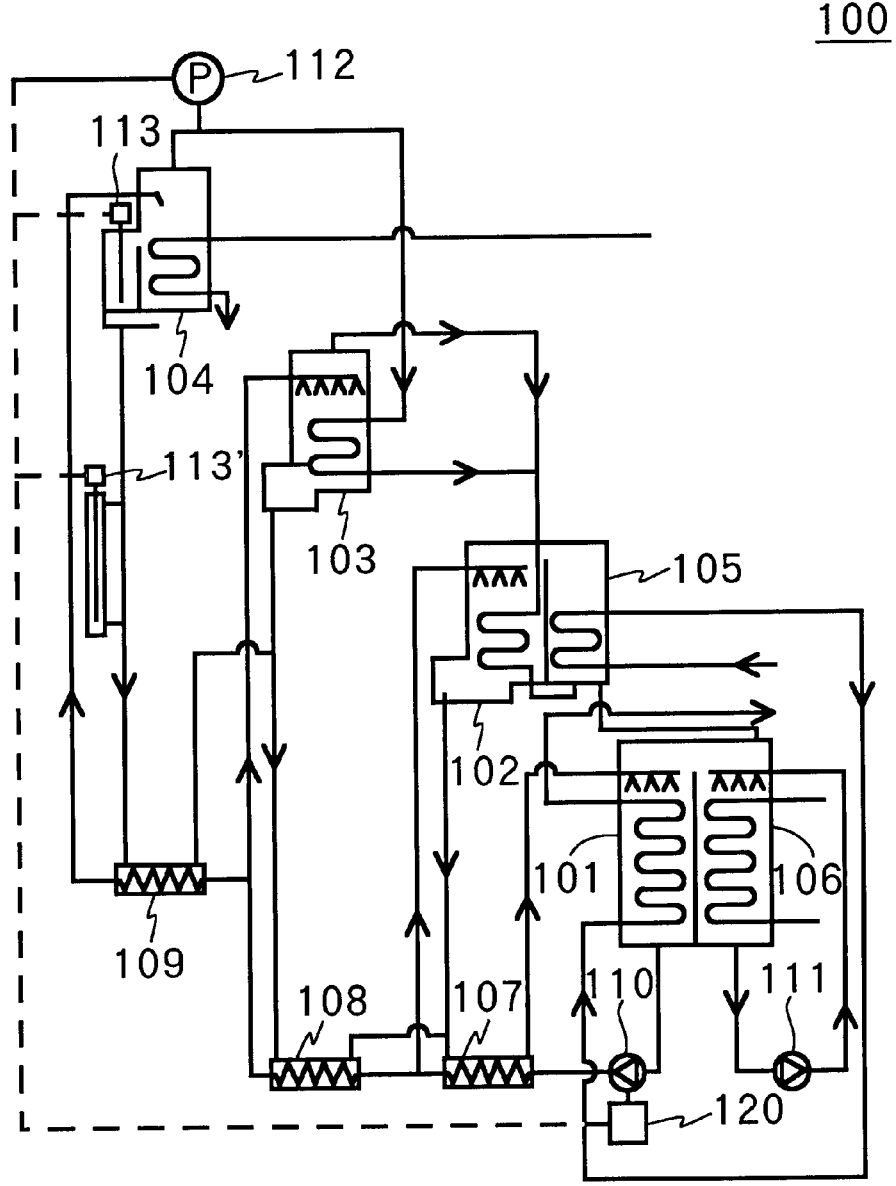
FIG. 7 is a schematic view of the conventional absorption refrigerator.

In addition, a prescribed percentage of the total quantity (for example, within a range of 30 to 90%) of the absorption fluid is fed back directly from the low-temperature regenerator 2 or from the medium-temperature regenerator 3 to the absorber 1 via the bypass piping 43 and 46. Therefore, it is not necessary to specially provide a separator for removing alcohol contained as a heat transfer accelerator from the absorption fluid fed to the high-temperature regenerator 4 (refer to Japanese Patent Publication No. 3040475, FIG. 7). It is thus easy to reduce the cost of the absorption refrigerator.

Furthermore, because a part of the absorption fluid is bypassed as described above, the intermediate fluid pump 12 and the concentrated fluid pump 13 can be downsized, it is possible to reduce the power consumption and heat loss in the feed path.

EMBODIMENT 2

The absorption refrigerator of Embodiment 2 of the invention is illustrated in FIG. 2. The absorption refrigerator A2 of this Embodiment 2 is based on modification of the heat exchanger system of the absorption refrigerator A of Embodiment 1, and the rest of refrigerator is of the same configuration.

More specifically, the absorption refrigerator A2 comprises: a high-temperature heat exchanger 55 which exchanges heat between the extra-concentrated absorption fluid fed back from the high-temperature regenerator 4 to the absorber 1 via the return piping 44 and the concentrated absorption fluid fed to the high-temperature regenerator 4 via the concentrated absorption fluid feed piping 45; a medium-temperature heat exchanger 56 which exchanges heat between a mixed fluid of the extra-concentrated absorption fluid after the above heat exchange and the concentrated absorption fluid joining the piping 44 via the concentrated fluid bypass piping 46, on the one hand, and the intermediate absorption fluid fed to the medium-temperature regenerator 3 via the intermediate fluid feed piping 42, on the other hand; and a low-temperature heat exchanger 57 which exchanges heat between a mixed fluid of the absorption mixed fluid after the above heat exchange and the intermediate absorption fluid joining the piping 44 via the intermediate fluid bypass piping 43, on the one hand; and the diluted absorption fluid fed to the low-temperature regenerator 2 via the diluted absorption fluid feed piping 41, on the other hand.

The absorption refrigerator A2 of Embodiment 2 permits regeneration of the absorption fluid by more effective use of the heat fed via the heat feeding unit 5, and saving of energy under the effect of such a configuration.

EMBODIMENT 3

Figure 3:
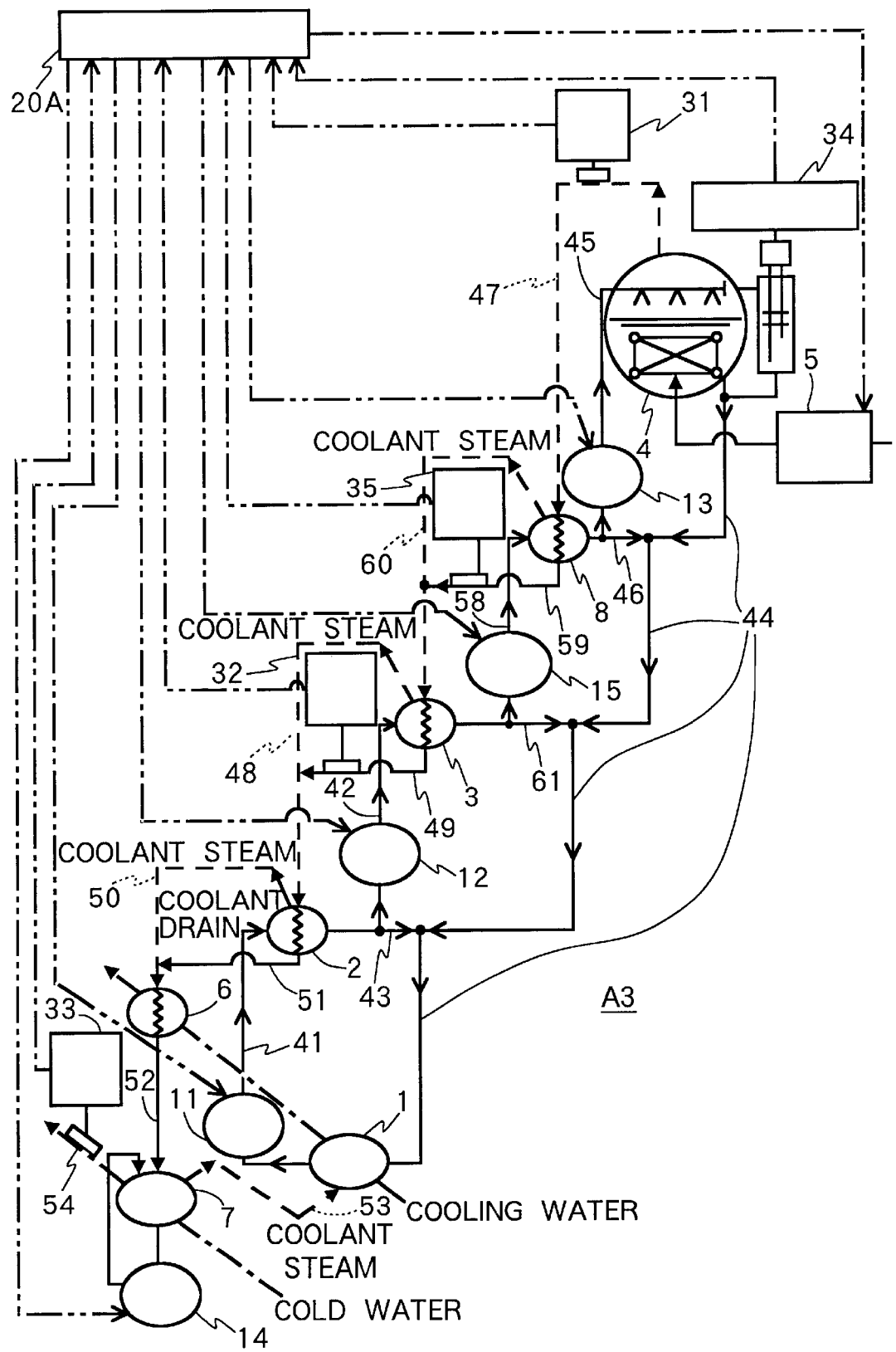
FIG. 3 is a schematic view of the absorption refrigerator of Embodiment 2 of the invention.

FIG. 3 is a schematic configuration diagram of the absorption refrigerator of Embodiment 3 of the invention. This absorption refrigerator A3 of this Embodiment 3 is based on modification of the absorption refrigerator A of Embodiment 1, which is a so-called quadruple-effect type absorption refrigerator by providing a second medium-temperature regenerator 8 in the feed path for feeding the absorption fluid from the medium-temperature regenerator 3 to the high-temperature regenerator 4.

That is, the absorption refrigerator A3 has a configuration in which a second medium-temperature regenerator 8 which heats and concentrates the absorption fluid heated and concentrated in the medium-temperature regenerator 3 (hereinafter referred to as the "second intermediate absorption fluid") by use of the coolant steam generated in the high-temperature regenerator 4, and a second intermediate fluid pump 15 which sends the second intermediate absorption fluid from the medium-temperature regenerator 3 to the second medium-temperature regenerator 8 are added to the absorption refrigerator A of Embodiment 1. The absorption fluid heated and concentrated in the second medium-temperature regenerator 8 is fed by the concentrated fluid pump 13 to the high-temperature regenerator 4.

The absorption refrigerator A3 has a second drain temperature sensor 35 which detects the temperature of the coolant drain after heating in the second medium-temperature regenerator 8, and a detection signal from this second drain temperature sensor 35 is entered, together with detection signals of the steam temperature sensor 31, the drain temperature sensor 32, the cold water temperature sensor 33 and the fluid level sensor 34, into a controller 20A of the absorption refrigerator A3. A steam pressure sensor may be provided in place of the steam temperature sensor 31, as in Embodiment 1.

The circulation cycle of the absorption fluid in the absorption refrigerator A3 is described as follows.

The absorption fluid absorbs coolant steam in the absorber 1 to become a diluted absorption fluid of a prescribed concentration (for example, 54 to 56 wt %), and fed to the low-temperature regenerator 2 by a diluted fluid pump 11 via a diluted fluid feed piping 41. The diluted absorption fluid fed to the low-temperature regenerator 2 is heated and concentrated in the low-temperature regenerator 2 to become an intermediate absorption fluid of a prescribed concentration (for example, 55 to 57 wt %), and a prescribed percentage (for example, 50 to 98%) of the intermediate absorption fluid is fed by the intermediate fluid pump 12 to the medium-temperature regenerator 3 via the intermediate fluid feed piping 42. The rest is, on the other hand, fed to the return piping 44 which brings the absorption fluid back to the absorber 1 via an intermediate fluid bypass piping 43 formed by branching the intermediate fluid feed piping 42 between the intermediate fluid pump 12 and the low-temperature regenerator 2.

The intermediate absorption fluid fed to the medium-temperature regenerator 3 is heated and concentrated in the medium-temperature regenerator 3 to become a second intermediate fluid of a prescribed concentration (for example, 56 to 58 wt %). A prescribed percentage (for example, 50 to 98%) of the second intermediate absorption fluid is fed by the second intermediate fluid pump 15 to the second medium-temperature regenerator 8 via the second intermediate fluid feed piping 58. The rest is, on the other hand, fed to the return piping 44 which brings the absorption fluid back to the absorber 1 via a second intermediate fluid bypass piping 61 formed by branching the second intermediate fluid feed piping 58 between the second intermediate fluid pump 15 and the medium-temperature regenerator 3.

The second intermediate absorption fluid fed to the second medium-temperature regenerator 8 is heated and concentrated in the second medium-temperature regenerator 8 to become a concentrated absorption fluid of a prescribed concentration (for example, 57 to 60 wt %). A prescribed percentage (for example, 50 to 98%) of the concentrated absorption fluid is fed by the concentrated fluid pump 13 to the high-temperature regenerator 4 via the concentrated fluid feed piping 45. The rest is fed to the return piping 44 which brings the absorption fluid back to the absorber 1 via a concentrated fluid bypass piping 46 formed by branching the concentrated fluid feed piping 45 between the concentrated fluid pump 13 and the second medium-temperature regenerator 8.

The concentrated absorption fluid fed to the high-temperature regenerator 4 is heated and concentrated in the high-temperature regenerator 4 to become an extra-concentrated absorption fluid of a prescribed concentration (for example, 59 to 63 wt %). The extra-concentrated absorption fluid is fed to the absorber 1 via the return piping 44. The concentration of the extra-concentrated absorption fluid fed back to the absorber via the return piping 44 is reduced to a prescribed level (for example, 59 to 62 wt %) under the effect of confluence of the concentrated absorption fluid from the second medium-temperature regenerator 8 in the downstream via the concentrated fluid bypass piping 46. The concentration is further reduced to another prescribed level (for example, 58 to 62 wt %) under the effect of confluence of the second intermediate absorption fluid from the medium-temperature regenerator 3 via the second intermediate bypass piping 61 in further downstream. The concentration is further reduced to a prescribed level (for example, 58 to 61 wt %) under the effect of confluence of the intermediate absorption fluid from the low-temperature regenerator 2 via the intermediate fluid bypass piping 43 in further downstream, and then, the fluid is fed to the absorber 1.

The coolant steam generated from the concentrated absorption fluid in the high-temperature regenerator 4 is fed as a heating source to the second medium-temperature regenerator 8 via a high-temperature steam return piping 47. The coolant steam generated from the second intermediate absorption fluid in the second medium-temperature regenerator 8 is fed as a heating source to the medium-temperature regenerator 3 via a second medium-temperature steam return piping 60. The coolant drain after heating in the second medium-temperature regenerator 8 joins the second medium-temperature steam return piping 60 via a third coolant drain piping 59.

The control performed by the controller 20A is described as follows.

The controller 20A controls the feed quantity of the absorption fluid by adjusting the number of revolutions of the diluted fluid pump 11, the intermediate fluid pump 12, the second intermediate fluid pump 15 and the concentrated fluid pump 13. That is, the controller 20A controls the flow rate of the diluted absorption fluid fed from the diluted fluid pump 11 from the absorber 1 to the low-temperature regenerator 2, the flow rate of the intermediate absorption fluid fed by the intermediate fluid pump 12 from the low-temperature regenerator 2 to the medium-temperature regenerator 3, the flow rate of the second intermediate absorption fluid fed by the second intermediate fluid pump 15 from the medium-temperature regenerator 3 to the second medium-temperature regenerator 8, and the flow rate of the concentrated absorption fluid fed by the concentrated fluid pump 13 from the second medium-temperature regenerator 8 to the high-temperature regenerator 4. More specifically, although not shown, revolutions control means is provided in the controller 20A so as to control the number of revolutions of the individual pumps 11, 12, 15 and 13.

In other words, in Embodiment 3, for the same reasons as in Embodiment 1, orifices (not shown in the figure) of an appropriate diameter are provided at the exits of the individual pumps 11, 12, 15, and 13 to make an adjustment so as to achieve a prescribed flow rate of the absorption fluid flowing through the feed pipings 41, 42, 58, and 45 upon rated operation. When it is necessary to readjust the circulation quantity of the absorption fluid because of a change in load or the like, the flow rate of the absorption fluid is adjusted by changing the number of revolutions of the individual pumps 11, 12, 15, and 13.

Even when an adjustment of the heat quantity fed by the heat feeding unit 5 in response to a change in load results in large changes in temperature and pressure in the high-temperature regenerator, it is possible, as in Embodiment 1, to conduct appropriate flow rate control so as to enable to continue stable operation through inhibition of imbalance of the absorption fluid flow rate or fluctuations of the absorption fluid level in the high-temperature regenerator 4 by adjusting the number of revolutions of the individual pumps 11, 12, 15, and 13.

The revolutions control of the pumps 11, 12, 15, and 13 performed by the controller 20A is described in detail as follows.

When there is a change in load, i.e., in the cold water temperature as detected by the cold water temperature sensor 33, the controller 20A adjusts the heat quantity fed by the heat feeding unit 5 so as to offset the change in load by use of a fed heat quantity control means (not shown in the figure). That is, the fed heat quantity is increased when the load increases, and the fed heat quantity is reduced when the load decreases.

When the heat quantity fed by the heat feeding unit 5 is thus adjusted, pressure and temperature in the high-temperature regenerator 4 change accordingly, and pressure and temperature of the coolant steam generated in the high-temperature regenerator 4 change. This change in the coolant steam temperature is detected by the steam temperature sensor 31, the drain temperature sensor 32 and the second drain temperature sensor 35 and entered into the controller 20A. The controller 20A controls the number of revolutions of the concentrated fluid pump 13 in the following manner in response to the change in the coolant steam temperature.

For example, when the load increases and the heat quantity fed by the heat feeding unit 5 is increased, pressure and temperature in the high-temperature regenerator 4 increase and pressure and temperature of the coolant steam generated in the high-temperature regenerator 4 increase. At this point, the controller 20A increases the number of revolutions of the concentrated fluid pump 13 for safety, thereby conducting control so as to reduce the inner pressure of the high-temperature regenerator 4 by increasing the absorption fluid flow rate.

When, on the contrary, the load is decreased and the heat quantity fed by the heat feeding unit 5 is decreased, the pressure and temperature in the high-temperature regenerator 4 and the pressure and temperature of the coolant steam generated in the high-temperature 4 decrease. At this point, the controller 20A conducts control so as to increase the inner pressure of the high-temperature regenerator 4 by decreasing the number of revolutions of the concentrated fluid pump 13 and reducing the absorption fluid flow rate. As a result, it is possible to continue stable operations within a temperature range and a pressure range suitable for continuous operation of the refrigerator A3.

The controller 20A adjusts the number of revolutions of the concentrated fluid pump 13 in response to the detection signal of the fluid level detecting sensor 34 for controlling the absorption fluid level of the high-temperature regenerator 4 within a prescribed range. That is, when the fluid level sensor 34 detects a prescribed high level, control is performed so as to lower the fluid level by decreasing the number of revolutions of the concentrated fluid pump 13 and reducing the absorption fluid flow rate. When the fluid level detecting sensor 34 detects a prescribed low fluid level, on the other hand, the controller 20A performs control so as to raise the fluid level by increasing the number of revolutions of the concentrated fluid pump 13 and increasing the absorption fluid flow rate.

When the absorption fluid level in the high-temperature regenerator 4 becomes lower than a prescribed emergency set value set taking account of safe operation of the refrigerator A3, alarm means (not shown in the figure) issues an alarm, and control is performed so as to stop supply of heat fed by the heat feeding unit 5.

When adjusting the number of revolutions of the concentrated fluid pump 13 in response to the result of detection of the fluid level detecting sensor 34, control may be conducted so as to switch over the number of revolutions of the concentrated fluid pump 13 among numbers of revolutions previously set stepwise. For example, the control frequency of the pump may be changed to 60 Hz, 57 Hz, 48 Hz, and 45 Hz, thereby performing stepwise control by increasing or decreasing the number of revolutions of the concentrated fluid pump 13. Or, the number of revolutions may be continuously changed in response to operating conditions, load and heat quantity fed by the heat feeding unit 5.

When controlling the number of revolutions of the concentrated fluid pump 13 in response to the result of detection of the steam temperature sensor 31, the drain temperature sensor 32, the second drain temperature sensor 35, and the fluid level detecting sensor 34, it is also possible to conduct control of the other pumps 11, 15, and 12 by selecting an appropriate one from combinations shown in the following.

TABLE 2

|  | Diluted Fluid Pump | Intermidiate Fluid Pump | Second Intermidiate Fluid Pump | Concentrated Fluid Pump |
| --- | --- | --- | --- | --- |
| Combination 1 | Revolution control | Revolution control | Revolution control | Revolution control |
| Combination 2 | Revolution control | Revolution control | Constant | Revolution control |
| Combination 3 | Revolution control | Constant | Constant | Revolution control |
| Combination 4 | Constant | Constant | Constant | Revolution control |

In this case, the quantity of absorption fluid fed by the individual pumps 11, 12, 15, and 13 is adjusted so as to improve the operating efficiency of the absorption refrigerator A3, and control is performed so as to ensure a number of revolutions sufficient to prevent shortage of fed absorption fluid quantity or shortage of head for the pumps 11, 12, 15, and 13.

In the absorption refrigerator A3 of Embodiment 3, as described above, the controller 20A appropriately adjusts the heat quantity fed by the heat feeding unit 5 when there is a change in load, and controls the number of revolutions of the diluted fluid pump 11, the intermediate fluid pump 12, the second intermediate fluid pump 15 and the concentrated fluid pump 13 so as to inhibit a change in the absorption fluid quantity in the regenerators caused by the change in the fed heat quantity. Even when there is a large fluctuation of load in a so-called quadruple-effect type absorption refrigerator, therefore, it is possible to stably supply cold water of the desired temperature continuously.

A fluid level sensor 34 is provided in the high-temperature regenerator 4 to monitor whether or not the absorption fluid quantity in the regenerator 4 is always within a prescribed range. When the prescribed range is exceeded, the number of revolutions of the concentrated fluid pump 13 is adjusted so that the absorption fluid quantity in the regenerator 4 is within the prescribed range. As a result, it is possible to temporarily change the ratio of the quantity of absorption fluid fed from the second medium-temperature regenerator 8 to the high-temperature regenerator 4 to the quantity of absorption fluid fed via the concentrated fluid bypass piping 46 to the return piping 44 from one in the rated operation. More specifically, the heating quantity in the high-temperature regenerator 4 is adjusted in response to a change in load. In addition, the coolant steam temperature and the fluid level in the high-temperature regenerator 4 are detected, and the number of revolutions of the concentrated fluid pump 13 is controlled so as to inhibit a change in fluid level caused by the adjustment of the heating quantity mentioned above, thus permitting stable cold water temperature control in a so-called quadruple-effect type absorption refrigerator.

When the quantity of fed absorption fluid decreases as a result of a failure of the concentrated fluid pump 13 or the like, and the quantity of absorption fluid in the high-temperature regenerator 4 detected by the fluid level detecting sensor 34 becomes lower than a prescribed emergency set value, and alarm means (not shown in the figure) provided issues an alarm, and operation of the absorption refrigerator A3 is discontinued for safety by stopping heating. As a result, it is possible to prevent occurrence of circumstances causing a trouble in continuous operation such as damages to the high-temperature regenerator 4 caused by overheating. In place of such safety stop control based on the result of detection by the fluid level detecting sensor 34, an absorption fluid temperature sensor for preventing empty vessel for detecting overheating caused by a decrease in the absorption fluid may be provided in the high-temperature regenerator 4, thereby executing safety stop control as described above in accordance with the result of this detection.

The absorption fluid is fed sequentially from the absorber 1, to the low-temperature regenerator 2, the medium-temperature regenerator 3, the second medium-temperature regenerator 8 and then the high-temperature regenerator 4 based on a so-called reverse cycle, and in addition, a prescribed percentage of absorption fluid (for example, 30 to 90%) of the total is fed back to the absorber 1 directly from the low-temperature regenerator 2, the medium-temperature regenerator 3, or the second medium-temperature regenerator 8 via the individual bypass pipings 43, 61, and 46. Therefore, it is not necessary to specially provide a separator (refer to Japanese Patent No. 3040475, FIG. 7) to remove alcohol contained as a heat transfer accelerator from the absorption fluid fed to the high-temperature regenerator 4, thus facilitating reduction of cost of the absorption refrigerator.

Since a part of the absorption fluid is bypassed as described above, the intermediate fluid pump 12, the second intermediate fluid pump 15, and the concentrated fluid pump 13 can be downsized, thus permitting reduction of the power consumption and minimization of heat loss during transfer.

EMBODIMENT 4

Figure 4:
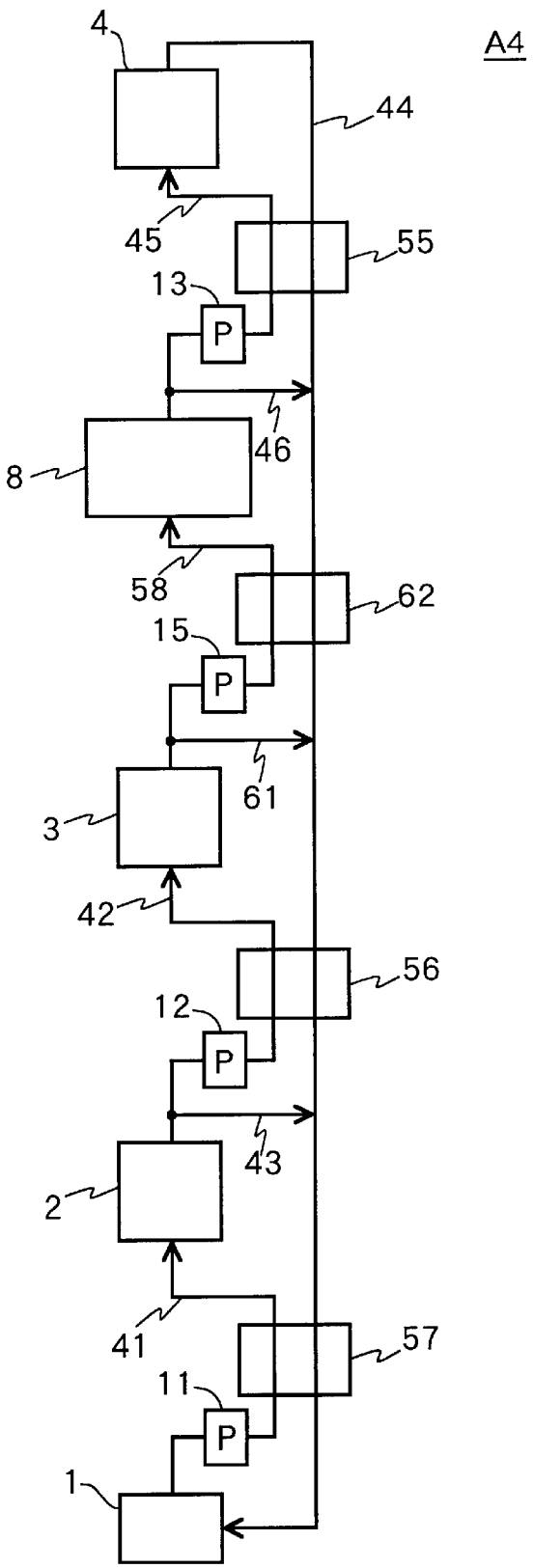
FIG. 4 is a schematic view of the essential part of the absorption refrigerator of Embodiment 4 of the invention.

FIG. 4 illustrates a schematic configuration of the absorption refrigerator of Embodiment 4 of the present invention. The absorption refrigerator A4 of Embodiment 4 is based on a modification of the heat exchange system in the absorption refrigerator A3 of Embodiment 3 of the invention, and the rest is of the same configuration.

The absorption refrigerator A4 of Embodiment 4 comprises: a high-temperature heat exchanger 55 which exchanges heat between the extra-concentrated absorption fluid fed from the high-temperature regenerator 4 back to the absorber 1 via the return piping 44 and the concentrated absorption fluid fed to the high-temperature regenerator 4 via the concentrated absorption fluid feed piping 45; a second medium-temperature heat exchanger 62 which exchanges heat between the mixed fluid of the extra-concentrated absorption fluid after this heat exchange and the concentrated absorption fluid joining the piping 44 via the concentrated fluid bypass piping 46, on the one hand, and the second intermediate absorption fluid fed to the second medium-temperature regenerator 8 via the second intermediate fluid feed piping 58, on the other hand; a medium-temperature heat exchanger 56 which exchanges heat between the mixed fluid of the absorption mixed fluid after the above heat exchange and the second intermediate absorption fluid joining the piping 44 via the second intermediate fluid bypass piping 61, on the one hand, and the intermediate absorption fluid fed to the medium-temperature regenerator 3 via the intermediate fluid feed piping 42, on the other hand; and a low-temperature heat exchanger 57 which exchanges heat between the mixed fluid of the absorption mixed fluid after the above heat exchange and the intermediate absorption fluid joining the piping 44 via the intermediate fluid bypass piping 43, on the one hand, and the diluted absorption fluid fed to the low-temperature regenerator 2 via the diluted absorption fluid feed piping 41, on the other hand.

According to the absorption refrigerator A4 of Embodiment 4, having the configuration as described above, the absorption fluid can be regenerated by more effective use of heat fed by the heat feeding unit 5, thus permitting energy saving.

EMBODIMENT 5

Figure 5:
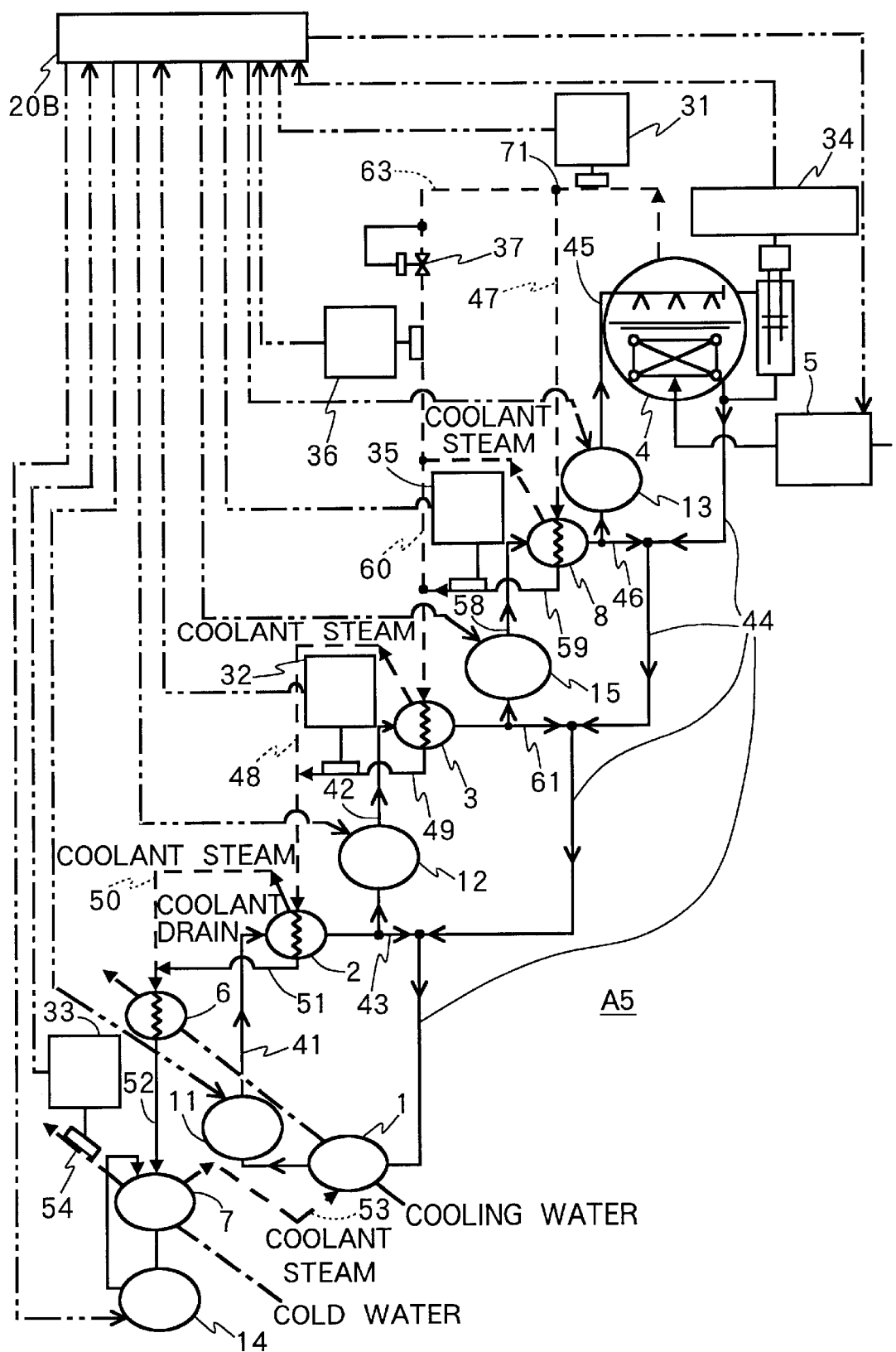
FIG. 5 is a schematic view of the absorption refrigerator of Embodiment 5 of the invention.

FIG. 5 illustrates a schematic configuration of the absorption refrigerator of Embodiment 5 of the present invention. This absorption refrigerator A5 is based on a modification of the absorption refrigerator A3 of Embodiment 3: the coolant steam from the high-temperature regenerator 4 is used as a heating source in the second medium-temperature regenerator 8 so as to prevent the inner pressure in the high-temperature regenerator 4 from becoming too high, and in addition, is appropriately utilized also as a heating source in the medium temperature regenerator 3 having an inner pressure lower than in the second medium-temperature regenerator 8.

More specifically, a second high-temperature steam return piping 63 which branches from the high-temperature steam return piping 47 and sends the coolant steam from the high-temperature regenerator 4 back to the medium-temperature regenerator 3 is provided in addition to the absorption refrigerator A3 of Embodiment 3, and a steam piping change-over valve 37 and a second coolant steam temperature sensor 36 are provided in this second high-temperature steam return piping 63. The steam piping change-over valve 37 is usually closed, and when an excessive pressure which may damage the high-temperature regenerator 4 is applied, the valve automatically opens for releasing the pressure for safety, serving as a safety valve.

The detection signal from the second coolant steam temperature sensor 36 is entered, together with detection signals from the sensors 31, 32, 33, 34, and 35, into the controller 20B. The controller 20B controls the number of revolutions and the fed heat quantity of the pumps 11, 12, 15, and 13 in response to the result of detection of the individual sensors 31, 32, 33, 34, 35, and 36.

The other components of the absorption refrigerator A5 are the same as those in the absorption refrigerator A3, and the description thereof is therefore omitted here.

The quadruple-effect absorption refrigerator permits, as described above, more efficient operation as compared with the triple-effect type absorption refrigerator. When the load is large in the quadruple-effect absorption refrigerator, however, the pressure becomes very high in the high-temperature regenerator 4, and this may result in rupture of the high-temperature regenerator 4. To avoid this inconvenience, in Embodiment 5, when the pressure in the high-temperature regenerator 4 becomes too high, the coolant steam generated from the concentrated absorption fluid by the high-temperature regenerator 4 is sent as a heating source both to the second medium-temperature regenerator 8 and the medium-temperature regenerator 3 so as to prevent the pressure in the high-temperature regenerator 4 from becoming too high.

Further, when the load is small and the pressure in the high-temperature regenerator 4 is relatively low, the steam piping change-over valve 37 is closed. In this state, the coolant steam does not flow into the second high-temperature steam piping 63, but flows only into the high-temperature steam return piping 47. That is, the absorption refrigerator A5 is operated as a high-efficiency quadruple-effect type absorption refrigerator.

In the absorption refrigerator A5 of Embodiment 5, when the load becomes larger to exceed a prescribed pressure, the coolant steam from the high-temperature regenerator 4 is caused to flow to the high-temperature steam return piping 47 and the second high-temperature steam return piping 63, thereby reducing the pressure in the high-temperature regenerator 4. When the pressure becomes lower than a prescribed one, on the other hand, the steam is caused only to the high-temperature steam return piping 47. The refrigerator can therefore serve as a high-efficiency quadruple-effect absorption refrigerator.

In the absorption refrigerator A5 of Embodiment 5, it is easier to operate so that the pressure in the high-temperature regenerator 4 does not exceed a prescribed level. It is therefore possible to operate the refrigerator under optimum operating conditions throughout the year.

A change-over unit which switches over the flow path of the coolant steam to any one of the pipings is provided at the turning point 71 of the high-temperature steam return piping 47 and the second high-temperature steam return piping 63, and the change-over unit is controlled by the controller 20B. The coolant steam may be caused to flow into any one of the high-temperature steam return piping 47 and the second high-temperature steam return piping 63. For example, when the load is low, the coolant steam may be caused to flow only into the high-temperature steam return piping 47 to permit operation as a high-efficiency quadruple-effect absorption refrigerator. When the load is high, on the other hand, the coolant steam may be caused to flow only into the second high-temperature steam return piping 63 so that heating of the absorption fluid is not carried out in the second medium-temperature regenerator 8 so as to ensure operation as a so-called triple-effect absorption refrigerator.

EMBODIMENT 6

Figure 6:
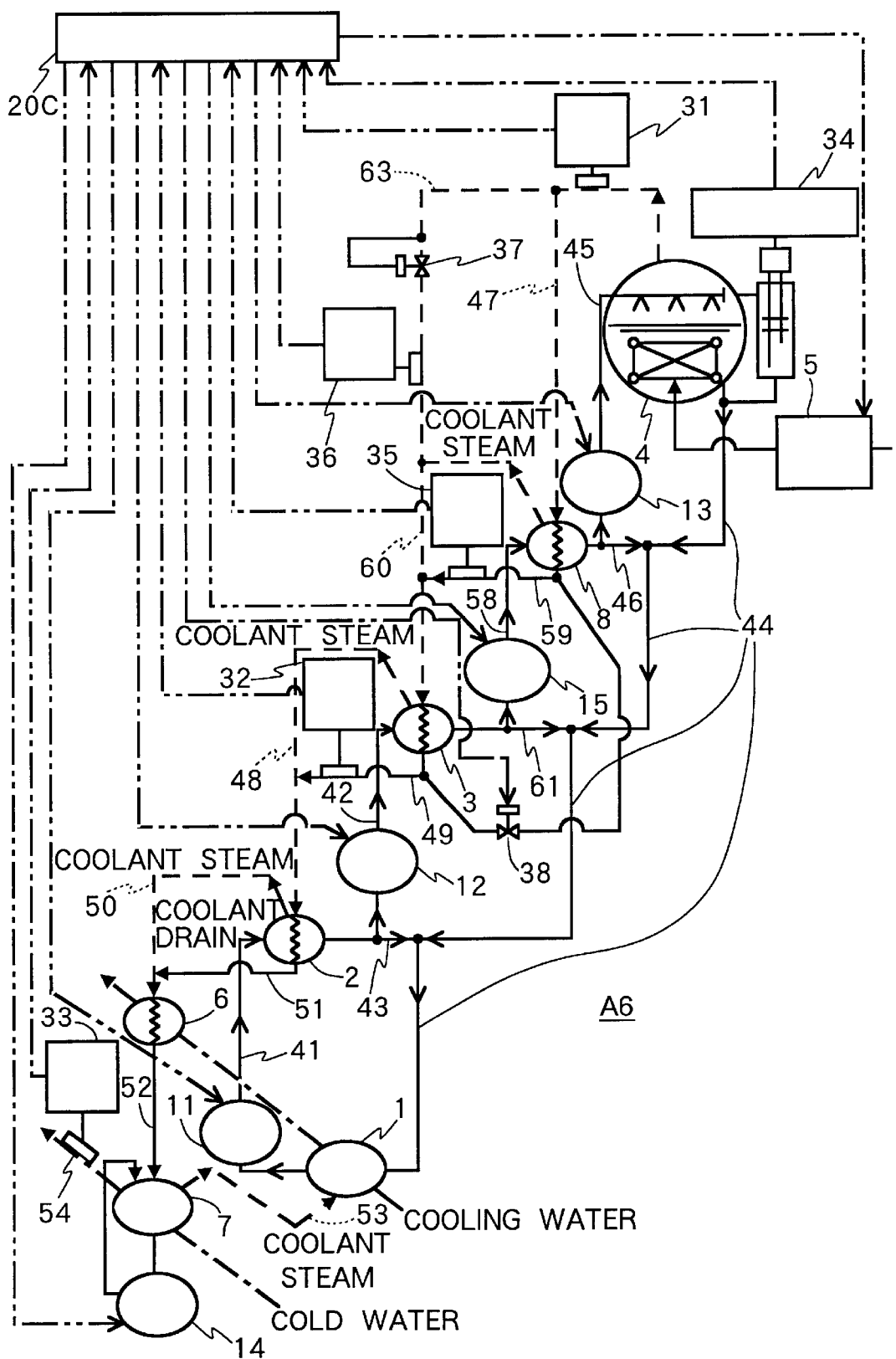
FIG. 6 is a schematic view of the absorption refrigerator of Embodiment 6 of the invention.

FIG. 6 shows a schematic configuration of the absorption refrigerator of Embodiment 6 of the invention. The absorption refrigerator A6 of Embodiment 6 is based on a modification of the absorption refrigerator A5 of Embodiment 5: a branch coolant drain piping 66 achieving communication between a third coolant drain piping 59 and a first coolant drain piping 49 is provided to ensure a uniform inner pressure in the second medium-temperature regenerator 8 and the medium-temperature regenerator 3.

More particularly, in the absorption refrigerator A6, a branch coolant drain piping 66 feeding the coolant drain after heating in the second medium-temperature regenerator 8 to the first coolant drain piping 49, which branches off from the third coolant drain piping 59 is added to the absorption refrigerator A5 of Embodiment 5, and a drain piping change-over valve 38 is provided in the branch coolant drain piping 66.

The controller 20C controls the number of revolutions and the fed heat quantity of the pumps 11, 12, 15, and 13 as well as the opening and closing of the drain piping change-over valve 38 in response to the result of detection of the sensors 31, 32, 33, 34, 35, and 36.

The other components of the absorption refrigerator A6, being the same as in the absorption refrigerator A5, is not described here.

Operation of the absorption refrigerator A6 of Embodiment 6 having the configuration as described above is described as follows.

When the pressure in the high-temperature regenerator 4 becomes over a prescribed pressure, the steam piping change-over valve 37 opens, and the coolant steam having so far been fed only to the second medium-temperature regenerator 8 via the high-temperature steam return piping 47 is also fed to the medium-temperature regenerator 3 having a lower pressure via the second high-temperature steam return piping 63, thus leading to a decrease in the inner pressure of the high-temperature regenerator 4. And, the steam temperature in the second high-temperature steam return piping 63 is detected by the second steam temperature sensor 36, and if the detected steam temperature is over a prescribed temperature, the controller 20C sends an instruction to open the steam piping change-over valve 37. As a result of opening of the steam piping change-over valve 37, the coolant drain is fed from the third coolant drain piping 59 to the first coolant drain piping 49 via the branched coolant drain piping 66, whereby the inner pressure in the second medium-temperature regenerator 8 and the medium-temperature regenerator 3 becomes uniform.

As described above, in the absorption refrigerator A6 of Embodiment 6, when the pressure in the high-temperature regenerator 4 is high, the coolant steam generated in the high-temperature regenerator 4 is fed both to the second medium-temperature regenerator 8 and to the medium-temperature regenerator 3, so that the coolant drain piping of the both regenerators communicate with each other, and consequently the pressure in the high-temperature regenerator 4 decreases, thus leading to a uniform inner pressure for both the second medium-temperature regenerator 8 and the medium-temperature regenerator 3, and thereby giving an effect to ensure stable operation.

The present invention has been described as above by means of the embodiments, however, the invention is not limited only to these embodiments, but numerous variants are also possible. For example, the number of the revolutions of the pumps has been described to be controlled by detecting the temperature of the coolant steam generated in the high-temperature regenerator, but the number of the revolutions of the pumps may be controlled on the basis of the coolant steam pressure.

In place of the high-temperature regenerator and the heat feeding unit used as described above, a once-through boiler may be used.

In Embodiment 3, furthermore, the second medium-temperature regenerator, or the second medium-temperature regenerator and the medium-temperature regenerator may be pressure vessels for a prescribed pressure. This provides an effect of increasing the pressure resistance and also improving safety at the same time.

Furthermore, in place of the steam piping change-over valve 37 in Embodiments 5 and 6, an automatic valve of which opening and closing are controlled by the controller 20B or 20C may be adopted. The drain piping change-over valve 38 in Embodiment 6 may be replaced by a so-called safety valve which can be opened automatically by application of a prescribed pressure.

According to the absorption refrigerator of the present invention, as described above, it is possible to remarkably improve the cooling performance as compared with the conventional single-effect or double-effect absorption refrigerator by adopting a triple-effect or quadruple-effect absorption refrigerator having the three-stage or four-stage regenerators.

The invention furthermore provides an excellent advantage of permitting the improvements of efficiency by reducing the ratio of absorption fluid circulated to the regenerators on the high-temperature side.

In the preferred embodiments of the invention, the heating quantity in the high-temperature regenerator is adjusted in response to changes in load and operating conditions, and the quantity of circulated absorption fluid is controlled so as to adjust the number of revolutions of the pumps for circulation of the absorption fluid on the basis of the result of detection of the pressure, temperature and the quantity of fluid in the high-temperature regenerator. As a result, therefore, even when there is a change in load, the invention provides an advantage of permitting stable performance of fluid quantity control in the high-temperature regenerator as well as continuous availability of a desired cooling effect.

Furthermore, in another preferred embodiment of the absorption refrigerator of the invention, there is also an advantage of detecting the pressure and temperature in the high-temperature regenerator and reducing the pressure in a quadruple-effect absorption refrigerator, which tends to be raised to a high temperature and a high pressure in the inside of its high-temperature regenerator.

We claim:

1. An absorption refrigerator having three-stage regenerators including a low-temperature, medium-temperature and high-temperature regenerators connected in series, comprising: a diluted fluid pump feeding diluted fluid obtained by causing an absorption fluid to absorb a coolant by means of an absorber to the low-temperature regenerator; an intermediate fluid pump feeding an intermediate absorption fluid obtained through heating and concentration of the diluted absorption fluid to the medium-temperature regenerator by means of the low-temperature regenerator; a concentrated-fluid pump feeding a concentrated absorption fluid obtained through heating and concentration of the intermediate absorption fluid in the medium-temperature regenerator to the high-temperature regenerator; an intermediate fluid bypass piping feeding back a part of the intermediate absorption fluid directly to the absorber so as to feed only a prescribed ratio of the intermediate absorption fluid obtained in the low-temperature regenerator to the medium-temperature regenerator by means of the intermediate fluid pump; and a concentrated fluid bypass piping feeding back a part of the concentrated absorption fluid directly to the absorber so as to feed back only a prescribed ratio of the concentrated absorption fluid obtained in the medium-temperature regenerator to the high-temperature regenerator by means of the concentrated fluid pump.

2. An absorption refrigerator having three-stage regenerators including a low-temperature, medium-temperature and high-temperature regenerators connected in series, comprising: load detecting means detecting a load; heat feeding means feeding the high-temperature regenerator with a heat quantity as a heating source; fed heat control means controlling a heat quantity fed by the heat feeding means to the high-temperature regenerator on the basis of the load detected by the load detecting means; a diluted fluid pump feeding the low-temperature regenerator with diluted fluid obtained by causing an absorption fluid to absorb a coolant by means of an absorber; an intermediate fluid pump feeding an intermediate absorption fluid obtained through heating and concentration of the diluted absorption fluid to the medium-temperature regenerator by means of the low-temperature regenerator; a concentrated-fluid pump feeding a concentrated absorption fluid obtained through heating and concentration of the intermediate absorption fluid in the medium-temperature regenerator to the high-temperature regenerator; an intermediate fluid bypass piping feeding back a part of the intermediate absorption fluid directly to the absorber so as to feed back only a prescribed ratio of the intermediate absorption fluid obtained in the low-temperature regenerator to the medium-temperature regenerator by means of the intermediate fluid pump; a concentrated fluid bypass piping feeding back a part of the concentrated absorption fluid directly to the absorber so as to feed back only a prescribed ratio of the concentrated absorption fluid obtained in the medium-temperature regenerator to the high-temperature regenerator by means of the concentrated fluid pump; and revolutions control means which controls the revolutions of the diluted fluid pump, the intermediate fluid pump and the concentrated fluid pump so as to feed only a prescribed ratio of the intermediate absorption fluid obtained in the low-temperature regenerator, to feed only a prescribed ratio of the concentrated absorption fluid obtained in the medium-temperature regenerator, and to feed a prescribed ratio of the diluted absorption fluid having absorbed the coolant in the absorber from the absorber to the low-temperature regenerator.

3. An absorption refrigerator according to claim 1 or 2, wherein the ratio of an initial rated circulation quantity is selected so that the prescribed ratio of the intermediate absorption fluid fed by the intermediate fluid pump to the medium-temperature regenerator is within a range of from 50 to 98% of the feed quantity of the low-temperature regenerator.

4. An absorption refrigerator according to claim 1 or 2, wherein the ratio of an initial rated circulation quantity is selected so that the prescribed ratio of the concentrated absorption fluid fed by the concentrated fluid pump to the high-temperature regenerator is within a range of from 50 to 98% of the feed quantity of the medium-temperature regenerator.

5. An absorption refrigerator according to claim 1 or 2, wherein the ratio of an initial circulation quantity is selected so that the feed quantity of the concentrated fluid pump during rated operation is within a range of from 30 to 90% of the feed quantity of the diluted fluid pump.

6. An absorption refrigerator according to claim 2, wherein: the absorption refrigerator has steam temperature detecting means detecting the temperature of coolant steam generated in the high-temperature regenerator; the revolutions control means performs control so as to increase the revolutions of the concentrated fluid pump when the temperature of the coolant steam detected by the steam temperature detecting means is over a prescribed temperature; and the revolutions control means performs control so as to reduce the revolutions when the temperature of the coolant steam detected by the steam temperature detecting means is under a prescribed temperature.

7. An absorption refrigerator according to claim 2, wherein: the absorption refrigerator has steam pressure detecting means detecting the pressure of coolant steam generated in the high-temperature regenerator; the revolutions control means performs control so as to increase the revolutions of the concentrated fluid pump when the pressure of the coolant steam detected by the steam pressure detecting means is over a prescribed pressure; and the revolutions control means performs control so as to decrease the revolutions of the concentrated fluid pump when the pressure of the coolant steam detected by the steam pressure detecting means is under the prescribed pressure.

8. An absorption refrigerator according to claim 2, wherein: the absorption refrigerator has drain temperature detecting means detecting the temperature of coolant drain after heating the medium-temperature generator of the coolant steam, fed as a heating source for heating and concentrating the intermediate absorption fluid from the high-temperature regenerator to the medium-temperature regenerator; and the revolutions control means performs control so as to increase the revolutions of the concentrated fluid pump when the temperature of the coolant drain detected by the drain temperature detecting means is over a prescribed temperature.

9. An absorption refrigerator according to claim 8, wherein, when the temperature of the coolant drain detected by the drain temperature detecting means is under the prescribed temperature, the revolutions control means performs control so as to reduce the revolutions of the concentrated fluid pump.

10. An absorption refrigerator according to claim 2, wherein: the absorption refrigerator has a fluid level detecting means detecting the level of the absorption fluid in the high-temperature regenerator; the revolutions control means performs control so as to reduce the number of revolutions of the concentrated fluid pump when the level of the absorption fluid in the high-temperature regenerator detected by the fluid level detecting means is over an upper limit level, and increases the number of revolutions of the concentrated fluid pump when the level of the absorption fluid is the high-temperature regenerator detected by the fluid detecting means is under a low limit level.

11. An absorption refrigerator according to claim 10, further comprising an alarm and emergency stop means which, when the level of the absorption fluid in the high-temperature regenerator detected by the fluid level detecting means is under an emergency set value set for safety, gives an alarm, and stops feeding of heat by the heat feeding means.

12. An absorption refrigerator according to claim 10 or 11, wherein, when the revolutions control means adjusts the number of revolutions of the concentrated fluid pump in response to the result of detection by the fluid level detecting means, the number of revolutions of the concentrated fluid pump is changed stepwise within a predetermined range of revolutions.

13. An absorption refrigerator according to claim 10 or 11, wherein, when the revolutions control means adjusts the number of revolutions of the concentrated fluid pump in response to the result of detection by the fluid level detecting means, the number of revolutions of the concentrated fluid pump is changed continuously.

14. An absorption refrigerator according to claim 10, wherein, when the revolutions control means adjusts the number of revolutions of the concentrated fluid pump in response to the result of detection by at least one of a steam temperature detecting means, a steam pressure detecting means, a drain temperature detecting means and the fluid level detecting means, control is performed so as to simultaneously adjust also the number of revolutions of at least any one of the diluted fluid pump and the intermediate fluid pump.

15. An absorption refrigerator according to claim 14, wherein the revolutions control means previously sets combinations of a number of revolutions of the concentrated fluid pump, the simultaneously controlled diluted fluid pump and/or the intermediate fluid pump, and a combination are be appropriately selected from these combinations.

16. An absorption refrigerator having four-stage regenerators including a low-temperature, a medium-temperature, a second medium-temperature and a high-temperature regenerators connected in series, comprising: load detecting means detecting the load; heat feeding means feeding a heat quantity as a heating means to the high-temperature regenerator; fed heat control means controlling a heat quantity fed by the heat feeding means to the high-temperature regenerator on the basis of the load detected by the load detecting means; a diluted fluid pump feeding a diluted absorption fluid obtained through absorption of a coolant by an absorption fluid by means of an absorber to the low-temperature regenerator; an intermediate fluid pump feeding an intermediate absorption fluid obtained by heating and concentrating the diluted absorption fluid in the low-temperature regenerator to the medium-temperature regenerator; a second intermediate fluid pump feeding the second intermediate absorption fluid obtained by heating and concentrating the intermediate absorption fluid in the medium-temperature regenerator to the second medium-temperature regenerator; a concentrated fluid pump feeding the concentrated absorption fluid obtained through heating and concentration of the second intermediate absorption fluid in the second medium-temperature regenerator to the high-temperature regenerator; an intermediate fluid bypass piping feeding back a part of the intermediate absorption fluid directly to the absorber so as to feed only a prescribed ratio of the intermediate absorption fluid obtained in the low-temperature regenerator to the medium-temperature regenerator by means of the intermediate fluid pump; a second intermediate fluid bypass piping feeding back a part of the second intermediate absorption fluid directly to the absorber so as to feed only a prescribed ratio of the second intermediate absorption fluid obtained in the medium-temperature regenerator to the second medium-temperature regenerator by means of the second intermediate fluid pump; a concentrated fluid bypass piping feeding back a part of the concentrated absorption fluid directly to the absorber so as to feed a prescribed ratio of the concentrated absorption fluid obtained in the second medium-temperature generator to the high-temperature regenerator by means of the concentrated fluid pump; and revolutions control means controlling the number of revolutions of the diluted fluid pump, the intermediate fluid pump, the second intermediate fluid pump and the concentrated fluid pump so as to feed a prescribed ratio of the intermediate absorption fluid obtained in the low-temperature regenerator to the medium-temperature regenerator, feed a prescribed ratio of the second intermediate absorption fluid obtained in the medium-temperature regenerator to the second medium-temperature regenerator, feed only a prescribed ratio of the concentrated absorption fluid obtained in the second medium-temperature regenerator, and feed a prescribed ratio of the diluted absorption fluid having absorbed the coolant by means of the absorber from the absorber to the low-temperature regenerator.

17. An absorption refrigerator according to claim 16, wherein the ratio of an initial rated circulation quantity is selected so that the prescribed ratio of the intermediate absorption fluid fed by the intermediate fluid pump to the medium-temperature regenerator is within a range of from 50 to 98% of the feed quantity of the low-temperature regenerator.

18. An absorption refrigerator according to claim 16, wherein the ratio of an initial rated circulation quantity is selected so that the prescribed ratio of the second intermediate absorption fluid fed by the intermediate fluid pump to the second medium-temperature regenerator is within a range of from 50 to 98% of the feed quantity of the medium-temperature regenerator.

19. An absorption refrigerator according to claim 16, wherein the ratio of an initial rated circulation quantity is selected so that the prescribed ratio of the concentrated absorption fluid fed by the concentrated fluid pump to the high-temperature regenerator is within a range of from 50 to 98% of the feed quantity of the second medium-temperature regenerator.

20. An absorption refrigerator according to claim 16, wherein the ratio of an initial circulation quantity is selected so that the feed quantity of the concentrated fluid pump during rated operation is within a range of from 30 to 90% of the feed quantity of the diluted fluid pump.

21. An absorption refrigerator according to claim 16, wherein: the absorption refrigerator has steam temperature detecting means detecting the temperature of coolant steam generated in the high-temperature regenerator; the revolutions control means performs control so as to increase the revolutions of the concentrated fluid pump when the temperature of the coolant steam detected by the steam temperature detecting means is over a prescribed temperature; and the revolutions control means performs control so as to reduce the revolutions when the temperature of the coolant steam detected by the steam temperature detecting means is under a prescribed temperature.

22. An absorption refrigerator according to claim 16, wherein: the absorption refrigerator has steam pressure detecting means detecting the pressure of coolant steam generated in the high-temperature regenerator; the revolutions control means performs control so as to increase the revolutions of the concentrated fluid pump when the pressure of the coolant steam detected by the steam pressure detecting means is over a prescribed pressure; and the revolutions control means performs control so as to decrease the revolutions of the concentrated fluid pump when the pressure of the coolant steam detected by the steam pressure detecting means is under the prescribed pressure.

23. An absorption refrigerator according to claim 16, wherein: the absorption refrigerator has drain temperature detecting means detecting the temperature of coolant drain after heating the second medium-temperature regenerator of the coolant steam, fed as a heating source for heating and concentrating the second intermediate absorption fluid from the high-temperature regenerator to the second medium-temperature regenerator; and a second temperature detecting means detecting the coolant drain temperature after heating the medium-temperature regenerator of coolant steam fed as a heating source for heating and concentrating the intermediate absorption fluid from the second medium-temperature regenerator to the medium-temperature regenerator; and when at least one of the coolant drain temperatures detected by the drain temperature detecting means and the second drain temperature detecting means becomes over the prescribed temperature thereof, the revolutions control means performs control so as to increase the number of revolutions of the concentrated fluid pump.

24. An absorption refrigerator according to claim 23, wherein: when at least one of the coolant drain temperatures detected by the drain temperature detecting means and the second drain temperature detecting means becomes under the prescribed temperature thereof, the revolutions control means performs control so as to reduce the number of revolutions of the concentrated fluid pump.

25. An absorption refrigerator according to claim 16, wherein: the absorption refrigerator has a fluid level detecting means detecting the level of the absorption fluid in the high-temperature regenerator; the revolutions control means performs control so as to reduce the number of revolutions of the concentrated fluid pump when the level of the absorption fluid in the high-temperature regenerator detected by the fluid level detecting means is over an upper limit level, and increases the number of revolutions of the concentrated fluid pump when the level of the absorption fluid in the high-temperature regenerator detected by the fluid level detecting means is under a low limit level.

26. An absorption refrigerator according to claim 25, further comprising an alarm and emergency stop means which, when the level of the absorption fluid in the high-temperature generator detected by the fluid level detecting means is under emergency set value set for safety, gives an alarm, and stops feeding of heat by the heat feeding means.

27. An absorption refrigerator according to claim 25 or 26, wherein, when the revolutions control means adjusts the number of revolutions of the concentrated fluid pump in response to the result of detection by the fluid level detecting means, the number of revolutions of the concentrated fluid pump is changed stepwise within a predetermined range of revolutions.

28. An absorption refrigerator according to claim 25 or 26, wherein, when the revolutions control means adjusts the number of revolutions of the concentrated fluid pump in response to the result of detection by the fluid level detecting means, the number of revolutions of the concentrated fluid pump is changed continuously.

29. An absorption refrigerator according to claim 25, wherein, when the revolutions control means adjusts the number of revolutions of the concentrated fluid pump in response to the result of detection by at least one of a steam temperature detecting means, a steam pressure detecting means, a drain temperature detecting means, a second drain temperature detecting means and the fluid level detecting means, control is performed so as to simultaneously adjust also the number of revolutions of at least any one of the diluted fluid pump, the intermediate fluid pump and the second intermediate fluid pump.

30. An absorption refrigerator according to claim 29, wherein the revolutions control means previously sets combinations of a number of revolutions of the concentrated fluid pump, the simultaneously controlled diluted fluid pump, the intermediate fluid pump, and/or the second intermediate fluid pump, and a combination is appropriately selected from these combinations.

31. An absorption refrigerator according to claim 16, having at least one of a low-temperature heat exchanger which heats the diluted absorption fluid fed from the diluted fluid pump and feeds the same to the low-temperature regenerator, a medium-temperature heat exchanger which heats the intermediate absorption fluid fed from the intermediate fluid pump and feeds the same to the medium-temperature regenerator, a second medium-temperature heat exchanger which heats the second intermediate absorption fluid fed from the second intermediate fluid pump and feeds the same to the second medium-temperature regenerator, and a high-temperature heat exchanger which heats the concentrated absorption fluid fed from the concentrated fluid pump and feeds the same to the high-temperature regenerator.

32. An absorption refrigerator according to claim 16, comprising: a second high-temperature steam return piping feeding the coolant steam from the high-temperature regenerator as a heating source to the medium-temperature regenerator; and a steam piping change-over valve provided in the second high-temperature steam return piping; wherein: the coolant steam from the high-temperature regenerator is fed as a heating source to the second temperature regenerator and the medium-temperature regenerator.

33. An absorption refrigerator according to claim 32, comprising: a branched coolant drain piping causing the second medium-temperature regenerator and the medium-temperature regenerator to communicate with each other; and a drain piping change-over valve provided in the branched drain piping.

34. An absorption refrigerator according to claim 31 or 32, wherein the steam piping change-over valve is a safety valve which opens when a pressure of over a value set for safety is applied.

35. An absorption refrigerator according to claim 33, wherein the drain piping change-over valve is controlled so as to open when the temperature in the high-temperature regenerator becomes over a value set for safety.

36. An absorption refrigerator according to claim 16, wherein only the second medium-temperature regenerator, or both the second medium-temperature regenerator and the medium-temperature regenerator are pressure vessels.

37. An absorption refrigerator according to claim 1 or 16, wherein, the high-temperature regenerator has a steam-fluid separator separating generated coolant steam and the absorption fluid.

38. An absorption refrigerator according to claim 1 or 16, wherein, the high-temperature regenerator is a once-through boiler.

39. An absorption refrigerator according to claim 1 and 16, wherein, the coolant is water, and the absorption fluid comprises lithium bromide.

* * * * *

UNITED STATES PATENT AND TRADEMARK OFFICE
CERTIFICATE OF CORRECTION

PATENT NO. : 6,408,643 B1
DATED : June 25, 2002
INVENTOR(S) : Takabatake et al.

It is certified that error appears in the above-identified patent and that said Letters Patent is hereby corrected as shown below:

<u>Title page,</u>
Item [75], Inventors,

The 1st and 4th Inventor should read:

-- (75)  Inventors:  1st – Shuzo Takabatake
                        4th – Hideharu Arai --

Signed and Sealed this

Thirty-first Day of December, 2002

JAMES E. ROGAN
*Director of the United States Patent and Trademark Office*